US011079601B2

(12) United States Patent
Greenberg

(10) Patent No.: US 11,079,601 B2
(45) Date of Patent: Aug. 3, 2021

(54) EYE PROJECTION SYSTEM AND METHOD

(71) Applicant: EYEWAY VISION LTD., Or Yehuda (IL)

(72) Inventor: Boris Greenberg, Tel Aviv (IL)

(73) Assignee: EYEWAY VISION LTD., Or Yehuda (IL)

(*) Notice: Subject to any disclaimer, the term of this patent is extended or adjusted under 35 U.S.C. 154(b) by 0 days.

(21) Appl. No.: 15/757,006

(22) PCT Filed: Sep. 1, 2016

(86) PCT No.: PCT/IL2016/050953
§ 371 (c)(1),
(2) Date: Mar. 2, 2018

(87) PCT Pub. No.: WO2017/037708
PCT Pub. Date: Mar. 9, 2017

(65) Prior Publication Data
US 2018/0246336 A1 Aug. 30, 2018

(30) Foreign Application Priority Data
Sep. 2, 2015 (IL) .......................................... 241033

(51) Int. Cl.
*G02B 27/01* (2006.01)
*G02B 27/00* (2006.01)
*G09G 3/02* (2006.01)

(52) U.S. Cl.
CPC ..... *G02B 27/0179* (2013.01); *G02B 27/0093* (2013.01); *G02B 27/0172* (2013.01);
(Continued)

(58) Field of Classification Search
CPC ............ G02B 27/0179; G02B 27/0093; G02B 27/0172; G02B 27/0176;
(Continued)

(56) References Cited

U.S. PATENT DOCUMENTS 4,878,046 A    10/1989  Smith
5,596,339 A *  1/1997  Furness, III ........... G02B 26/10
                                                              345/8
(Continued)

FOREIGN PATENT DOCUMENTS

EP        0826207 A1    3/1998
JP     2004191962 A     7/2004
(Continued)

OTHER PUBLICATIONS

Hewitt D. Crane et al., "Generation-V dual-Purkinje-image eyetracker", Feb. 15, 1985, Applied Optics, vol. 24, No. 4 pp. 527-537.— Abstract only.

*Primary Examiner* — Stephen G Sherman
(74) *Attorney, Agent, or Firm* — Browdy and Neimark, PLLC

(57) ABSTRACT

An eye projection device is provide comprising an eye projection system configured for projecting a light beam to propagate along a propagation path to an eye. The eye projection system comprises: an optical assembly defining a general optical path of light in said optical assembly, the optical assembly comprising a deflector arrangement comprising one or more adjustable optical deflectors arranged along said general optical path and configured to define an adjustable propagation path of the light beam from the optical assembly to the eye; wherein said one or more optical deflectors are configured with at least three adjustable deflection parameters affecting deflection of said propagation path to provide at least three degrees of freedom in adjusting the propagation path of said light beam towards said eye; wherein two of said at least three degrees of freedom are associated with two angular orientations of the propagation path to the eye for compensating over angular changes in a gaze direction of the eye, and at least one of said at least three degrees of freedom are associated with a lateral
(Continued)

deflection of the propagation path for compensating over variations in a relative lateral position of said projection system relative to the eye.

24 Claims, 14 Drawing Sheets

(52) U.S. Cl.
CPC ........... *G02B 27/0176* (2013.01); *G09G 3/02* (2013.01); *G02B 2027/0127* (2013.01); *G02B 2027/0159* (2013.01); *G02B 2027/0178* (2013.01); *G02B 2027/0187* (2013.01); *G09G 2320/0626* (2013.01); *G09G 2320/0666* (2013.01); *G09G 2354/00* (2013.01)

(58) Field of Classification Search
CPC .... G02B 2027/0127; G02B 2027/0159; G02B 2027/0178; G02B 2027/0187; G09G 3/02; G09G 2320/0626; G09G 2320/0666; G09G 2354/00; G06F 3/0383; G06F 3/0346; G06F 3/14; G06F 1/1601; A63F 13/25; A63F 13/52; G01P 13/00
USPC .......................................................... 345/8
See application file for complete search history.

(56) References Cited

U.S. PATENT DOCUMENTS

| | | |
|---|---|---|
| 6,943,754 B2 | 9/2005 | Aughey et al. |
| 7,542,210 B2 | 6/2009 | Chirieleison |
| 7,936,519 B2 | 5/2011 | Mukawa et al. |
| 8,289,231 B2 | 10/2012 | Budd et al. |
| 8,384,999 B1 | 2/2013 | Crosby et al. |
| 8,860,696 B2 | 10/2014 | Wassvik et al. |
| 9,094,677 B1 | 7/2015 | Mendis et al. |
| 2004/0109135 A1 | 6/2004 | Watanabe et al. |
| 2007/0159599 A1* | 7/2007 | Yamada ............. G02B 27/0093 351/211 |
| 2008/0002262 A1* | 1/2008 | Chirieleison ...... G02B 27/0093 359/630 |
| 2012/0154277 A1 | 6/2012 | Bar-Zeev et al. |
| 2013/0016413 A1 | 1/2013 | Amirparviz et al. |
| 2013/0044042 A1 | 2/2013 | Olsson et al. |
| 2013/0222384 A1* | 8/2013 | Futterer ................... G02B 5/32 345/426 |
| 2015/0097772 A1* | 4/2015 | Starner ................... G06F 3/013 345/158 |
| 2015/0173846 A1 | 6/2015 | Schneider et al. |

FOREIGN PATENT DOCUMENTS

| | | |
|---|---|---|
| JP | 2010091944 A | 4/2010 |
| JP | 2012038833 A | 2/2012 |
| JP | 2012508913 A | 4/2012 |
| JP | 2014082273 A | 5/2014 |
| WO | 2013/117999 A1 | 8/2013 |
| WO | 2014/085764 A1 | 6/2014 |
| WO | 2015/132775 A1 | 9/2015 |

* cited by examiner

300

- 310 - Provide a first beam deflector arranged in an optical path of an optical system to affect an orientation of the light beam at the exit pupil/port of the optical system

- 320 – Provide a second beam deflector arranged in the optical path to affect a lateral position of the light beam at the exit pupil/port.

- 330 – Provide a first light sensor with plurality of light detectors arranged for sensing light propagating from the exit pupil/port along the optical path after the light beam interacts with the first beam deflector

- 340 – Provide a second light sensor with plurality of light detectors arranged for sensing light propagating from the exit pupil/port along the optical path after the light beam interacts with the second beam deflector

- 350 – direct a light beam (tracking light beam) to propagate along the optical path of the optical system to exit from exit

- 360 – Obtain first readout data from the first sensor; the first readout data being indicative of a first projection location on the first sensor of a reflected/returned light beam propagating back through the exit pupil along the optical path to the first sensor

- 370 – Operate at least the first beam deflector, based on the first readout data, to compensate over variation between the first projection location and a first reference location on the first sensor;

- 380 – Obtain second readout data from the second sensor; the second readout data being indicative of a second projection location on the second sensor of the reflected/returned light beam propagating along the optical path to the second sensor

- 390 – Operate at least the second beam deflector, based on the second readout data, to compensate over variations between the second projection location and a second reference location on the second sensor;

Fig. 3B

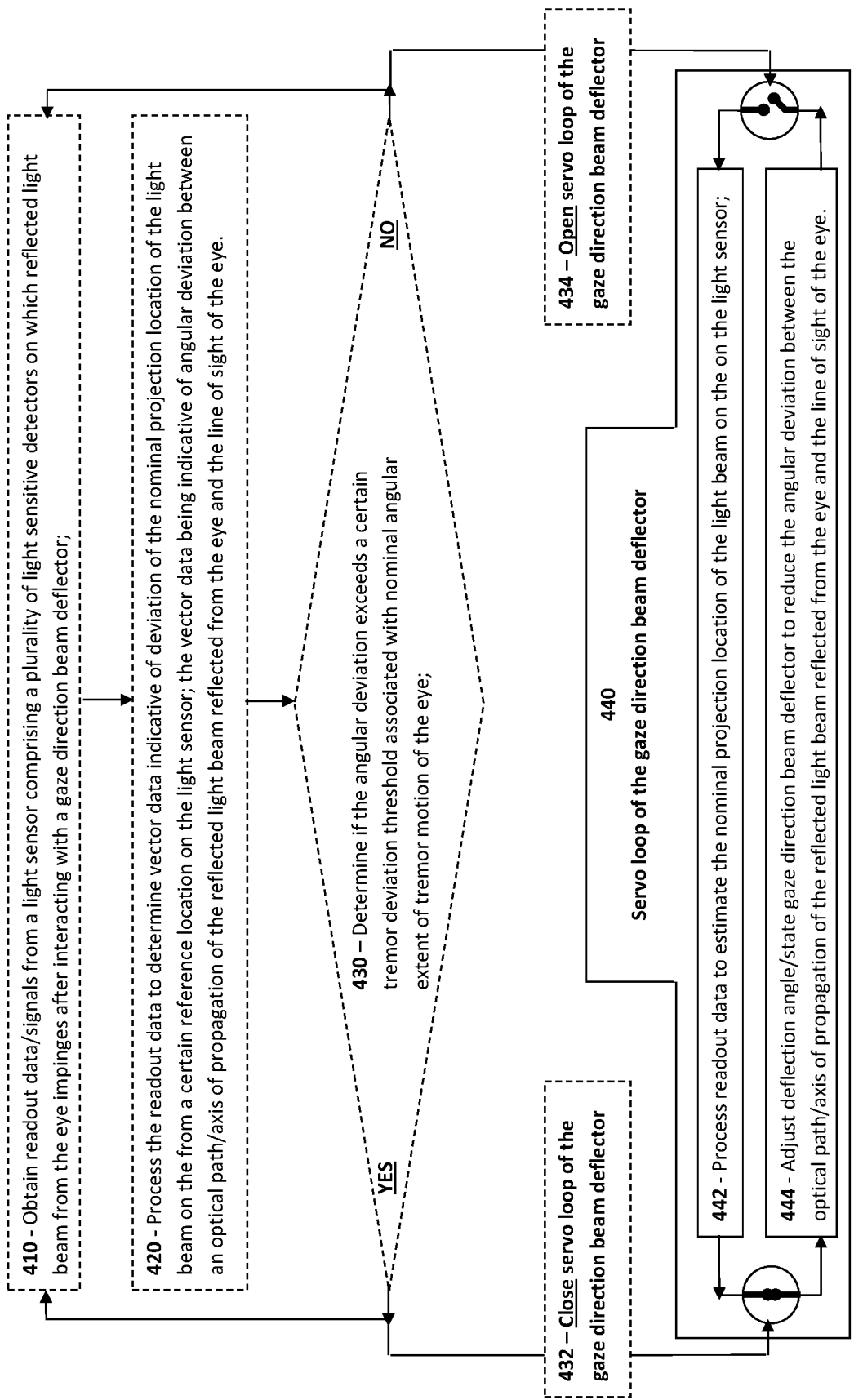

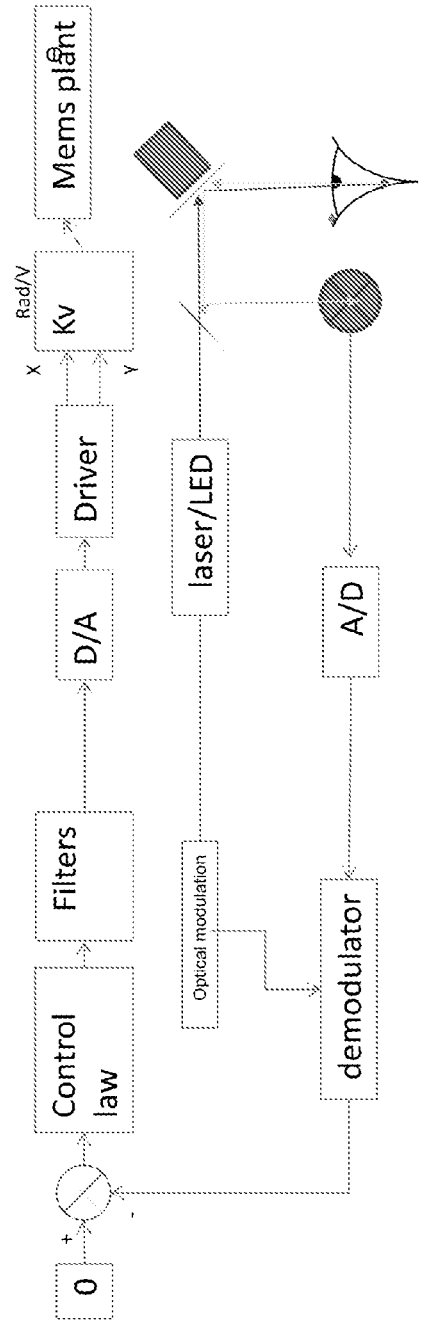

450
Servo loop of the pupil position beam deflector

452 - Process readout data to estimate the nominal projection location of the light beam on the on the light sensor;

454 - Adjust deflection angle/state gaze direction beam deflector to reduce the angular deviation between the optical path/axis of propagation of the reflected light beam reflected from the eye and the line of sight of the eye.

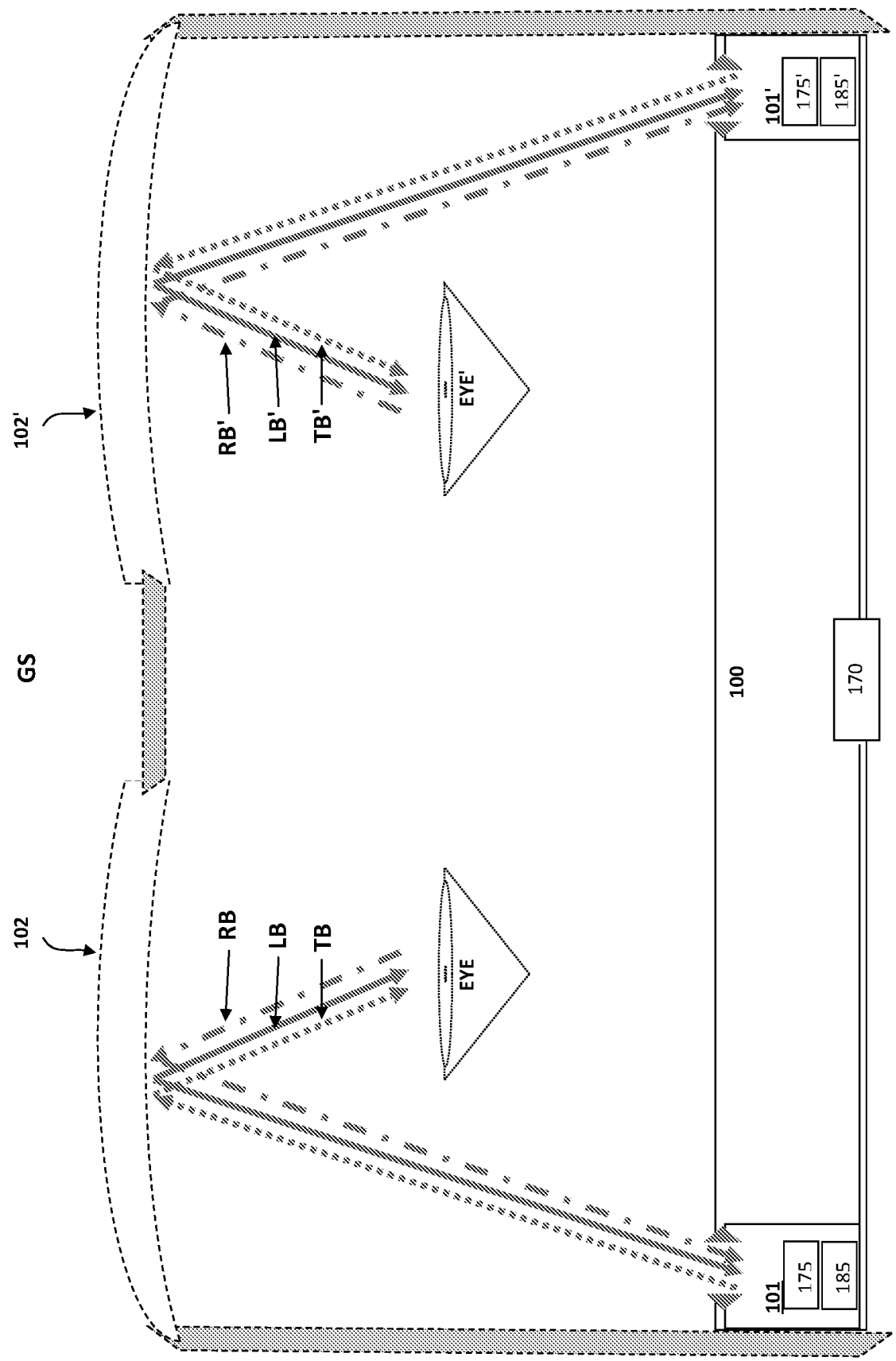

EYE PROJECTION SYSTEM AND METHOD

TECHNOLOGICAL FIELD

The invention is in the field of eye projection, and more specifically relates to techniques for projecting pure/augmented virtual reality imagery to user eyes.

BACKGROUND

Head mounted or otherwise wearable image projection system for projecting virtual and/or augmented virtual reality to the user eye(s) are becoming increasingly popular. Such systems are in many cases configured as glasses mountable onto a use's head and operable for projecting images to the user's eyes for providing virtual reality image/video projection to the user. To this end, certain of the known systems are aimed at providing pure virtual reality image projections to the user eyes, in which light from the external scenery is blocked from reaching the eye(s), while other systems are directed to provide augmented virtual reality perception, in which the light from the external scenery is allowed to pass to the eyes, while also being augmented/superposed by images/video frames projected to the eyes by the image projection systems.

For example, U.S. patent application No. 2013044042 discloses an electronic device including a frame configured to be worn on the head of a user. The frame can include a bridge configured to be supported on the nose of the user and a brow portion coupled to and extending away from the bridge and configured to be positioned over a side of a brow of the user. The frame can further include an arm coupled to the brow portion and extending to a free end. The first arm can be positioned over a temple of the user with the free end disposed near an ear of the user. The device can also include a transparent display affixed to the frame adjacent the brow portion and an input affixed to the frame and configured for receiving from the user an input associated with a function. Information related to the function can be presentable on the display.

U.S. Pat. No. 7,936,519 discloses a head mounted display including: an eyeglasses frame-like frame to be mounted onto an observer's head; and two image display devices, each of the image display devices including an image generating device, and light guide means which is mounted to the image generating device, which as a whole is located on the side of the center of an observer's face relative to the image generating device, on which beams emitted from the image generating device are incident, through which the beams are guided, and from which the beams are emitted toward an observer's pupil.

U.S. Pat. No. 8,289,231 discloses a head mounted virtual image display unit which is compact in size and weight, and incorporates a high performance optical system offering a clear see-through capability. A sliding light shield may be incorporated for those instances when see-through capability is not desired. A focus adjustment may be incorporated to permit the focusing of the image, for example, at a distance of approximately 18 inches to infinity. An adjustable headband may be incorporated that adapts to fit the users head. A flexible boom structure may be incorporated to facilitate fine positional adjustment of the optical assembly. A slider and ball joint mechanism may also be incorporated to facilitate positional adjustment of the optical assembly. A built-in microphone may be incorporated to enable speech input by the user. The head mounted virtual image display unit may be used comfortably in conjunction with eye or safety glasses, and provides a useful image to the user without blocking his view of the surrounding environment. The unit is designed to have a pleasing appearance so as to greatly enhance user acceptability.

U.S. Pat. No. 8,384,999 discloses an optical module for head mounted displays and other applications. The optical module includes an optical substrate and optical superstrate having inter-engaging ridged surfaces. A reflective layer is formed on at least one of the surfaces. An index matching material may be located between the surfaces. A region that receives a projected image, from a projector, directs rays launched from the projector onto the ridged surfaces, so that in use a viewer perceives an augmented image. The augmented image includes reflected rays from the projector and transmitted rays from an object located on an opposite side of the module to that of the viewer.

In certain techniques eye position and movement are tracked to determine a focal region for the user. An eye tracking technique is disclosed for example in "Generation-V dual-Purkinje-image eyetracker" by Hewitt D. Crane and Carroll M. Steele, 15 Feb. 1985, APPLIED OPTICS, Vol. 24, No. 4 pages 527-537. Another example of a technique for tracking gaze is disclosed in U.S. Pat. No. 6,943,754.

U.S. patent application No. 2012154277 discloses a method and system that enhances a user's experience when using a near eye display device, such as a see-through display device or a head mounted display device is provided. An optimized image for display relative to a field of view of a user in a scene is created. The user's head and eye position and movement are tracked to determine a focal region for the user. A portion of the optimized image is coupled to the user's focal region in the current position of the eyes, a next position of the head and eyes predicted, and a portion of the optimized image coupled to the user's focal region in the next position.

U.S. Pat. No. 7,542,210 discloses a head mounted display device having a mount which attaches the device to a user's head, a beam-splitter attached to the mount with movement devices, an image projector which projects images onto the beam-splitter, an eye-tracker which tracks a user's eye's gaze, and one or more processors. The device uses the eye tracker and movement devices, along with an optional head-tracker, to move the beam-splitter about the center of the eye's rotation, keeping the beam-splitter in the eye's direct line-of-sight. The user simultaneously views the image and the environment behind the image. A second beam-splitter, eye-tracker, and projector can be used on the user's other eye to create a stereoptic, virtual environment. The display can correspond to the resolving power of the human eye. The invention presets a high-resolution image wherever the user looks.

International patent publication No. WO 2013/117999 discloses systems, methods and computer program products for gaze tracking. An exemplary method includes directing light into an eye using a projector; detecting, using an image-capturing module, a reflection from a surface associated with the eye; and determining a line of sight associated with the eye based on the detected reflection. In some embodiments, the light comprises infra-red light. In some embodiments, the projector comprises a laser. In some embodiments, the projector comprises a liquid crystal on silicon (LCoS) chip. In some embodiments, the surface associated with the reflection is at least one of the cornea, the iris, or the retina.

GENERAL DESCRIPTION

Conventional projection systems for providing virtual or augmented reality to users are generally based on the projection of an image (e.g. a video image) towards the user eyes, such that the image is perceived by the user eye as being located/focused at an intermediate image plane located a certain distance in front of the eye (e.g. typically a distance of about 4 to several meters away from the eye). The short distance of intermediate image plane, on which the image is focused (e.g. focus at 4 meters), is almost/practically indifferentiable from, and generally equivalent to, a focus at infinity, in particular in cases/eye projection systems where the exit pupil is relatively large (e.g. in the order of around 15 mm) and in typical eye projection systems. The depth of focus of such eye projection systems is therefore also very large, and it is difficult to measure and accurately adjust the focal length (the distance to the intermediate plane). However, the eyes, which have smaller entrance pupil and accordingly depth of focus, remain sensitive to inaccuracies in the focal length of the eye projection system. This causes significant eye fatigue, and is in particular problematic when the image is viewed with both eyes, since it may be a discrepancy between the respective focal distances which the eyes see. The intermediate image plane, onto which the image is projected, may be a real image plane in front of the eye (i.e. at which the projected light beams forming the image are actually focused) or a virtual image plane (i.e. at which the projected light beams forming the image are perceived to be focused by the user eye). In any case, in such conventional image projection systems, the intermediate image plane has to be optically relayed to the user's eye. In other words, as the intermediate image plane (be it virtual or real image plane) is typically placed at a certain finite distance in front of the eye, it is thus focused onto the eye retina only when the eye lens focuses to that certain distance.

There are two general approaches for projection of images to the eye; one is defined by the exit pupil of the system and the other is defined by the eye box of the system. The main difference between the two approaches is that exit pupil approach provides uniform light intensity over the projection area with very sharp transitional edges, while the eye box approach yields smooth transitional edges, but the image intensity over the projection area is not uniform.

One major deficiency of conventional virtual/augmented reality imaging techniques, which project images perceived at a certain finite distance from the user eyes, relates to the development of eye fatigue, and in many cases, headaches are associated with the fact that while the objects in the projected image may be perceived at various distances from the eye, the image captured by the eye is actually located/focused at the fixed distance from the eye. This generally confuses/distresses the visual sensory mechanisms in the brain, yielding eye fatigue and headaches.

Another major deficiency of conventional techniques relates to variations between the relative position and orientation of the eye relative to the projection systems (e.g. variations associated with movement of the projection device relative to the eye). Such variations actually change the location at which the projected image is perceived by the user eye, which causes significant discomfort to persons using the conventional virtual/augmented reality glasses.

The present invention provides a novel eye projection technique, which enables to solve the above deficiencies of the known in the art techniques. More particularly, the present invention provides novel systems and methods for direct projection of images directly onto the eye retina (without having an intermediate actual/virtual optical image projection plane external to the eye).

The principles of technique of direct projection of images on the eye retina, are described for example in more details in co-pending International patent application No. PCT/IL2014/050210, co-assigned to the assignee of the present application, and incorporated herein by reference. This direct projection of images directly onto the retina of the eye allows for generating images with improved depth of field on the retina, thus avoiding or at least significantly reducing the eye discomfort and fatigue that is consequence of the eye's attempts to focus at wrong distances.

The present invention additionally provides novel systems and methods for monitoring and/or tracking both the position of the eye and the line of sight/gaze of the eye/pupil. Also the present invention provides novel eye projection devices/systems which are capable of directing the projected image(s) onto the user eye(s) while compensating over changes in the position/location of the eyes relative to the projection devices and also compensating over changes in the gaze directions. Advantageously, the technique of the present invention allows such compensation to be performed at very high rates (e.g., in the order of $10^{-3}$ sec or even below), which are fast enough, e.g. before the user perceives any changes/flickers in the location of the image projection on the retina associated with the gaze/eye position change. Accordingly, the images can be projected at fixed location on the retina while being unaffected by gaze changes and/or changes in the relative position between the eyes and the projection system.

This is achieved by a novel technique based on optical measurement of the eye optical axis direction (also referred to interchangeably as the line of sight (LOS) or gaze direction of the eye). This novel approach is advantageous in comparison to common eye tracking systems which rely on Purkinje images (e.g. and their combinations) for assessment of the pupil position in reference to a static light source. This is because the Purkinje image analysis has two significant disadvantages: one is the fact that the image has to be actually analyzed which takes time and puts a lot of requirements on the image itself, such as parasitic illumination, contrast and noise; the second is that the eye is not an entirely rigid body and various parts of the eye move somewhat independently thus resulting in deviation between gaze direction (eye optical axis) and Purkinje images of up to +/−0.3 degrees. Additionally, the time scales of micro saccades and eye tremor are entirely outside the common camera exposure time domain, which renders it impossible to achieve adequate exposed frames without subsequently exceeding the maximum permissible exposure (MPE) values for the eye and thus causing permanent or temporary eye damage.

In this regards, it should be noted that small saccadic movements (tremor) of the image on the retina (which are effected by saccadic movements of the eye) are needed/required for the perception of images by the eye. With tremor related movement of the image on the retina the image is perceived stable and located at fixed orientation (position/angle/direction) with respect to the eye/retina. A state without tremor movement will cause a condition usually referred to as retina fatigue. This condition is manifested in gradual perceptual disappearance of static parts of the projected image (which projections on the retina are not moved by tremor related movement).

To solve that and avoid the retina fatigue condition, the invention also provides a technique for filtering/avoiding compensation over tremor movements of the eye. To this end, the phrase fixed/specific location on the retina should be understood as a location on the retina which is fixed to the extent permitted by the saccadic eye movement, but which may not be absolutely fixed in some cases and may slightly move due to the saccadic eye movements. Accordingly, it should be noted that the technique of the present invention, which is described in more details below, provides for compensating for large movement of the eye (e.g. associated with changes in the gaze direction and/or with a change in the position of the eye-glasses on the face), while small eye movement, such as saccadic movements (tremor), may not be compensated, while still permitting the image to appear completely stable on the fixed location on the retina.

Thus, according to a broad aspect of the present invention there is provided an eye projection device comprising an eye projection system configured for projecting a light beam to propagate along a propagation path to an eye. The eye projection system includes an optical assembly defining a general optical path of light in the optical assembly. The optical assembly includes a deflector arrangement including one or more adjustable optical deflectors arranged along the general optical path and configured to define an adjustable propagation path of the light beam from the optical assembly to the eye. According to the invention, the one or more optical deflectors are configured with at least three, and typically four, adjustable deflection parameters and are arranged to affect at least three, and typically four, degrees of freedom in the deflection of the propagation path to the eye to thereby enable adjusting the propagation path of the light beam towards the eye. Two of the at least three degrees of freedom are generally associated with two angular orientations of the propagation path to the eye for compensating over angular changes in a gaze direction of the eye, and at least one and typically two of the three or four degrees of freedom are associated with a lateral deflection of the propagation path for compensating over variations in a relative lateral position of the projection system relative to the eye.

In some embodiments, the eye projection device also includes a controller adapted to receive data indicative of the changes in the gaze direction of the eye and the changes in the relative lateral position of the eye projection system relative to the eye, and adjust the deflection parameters of the one or more adjustable optical deflectors in accordance with this data for directing the light beam to be incident on a specific location on a retina of the eye, irrespective of variations in the gaze direction of the eye and variations in the position of the eye projection system.

In some embodiments, the eye projection system is adapted for projecting images directly on a retina of the eye. The eye projection system may include an image projection module for projecting the image(s) on a retina of an eye, including a light module adapted for outputting the light beam to be projected on the retina and an image light modulator arranged along the general optical path of the light beam. The image light modulator is configured and operable to receive image data indicative of one or more pixels of the image and modulate the light beam to encode the image data on the light beam such that the image is formed on the retina. More specifically, the eye projection device may include an image projection controller connectable to the image light modulator and adapted for receiving image data indicative of the image and operating the image light modulator to adjust intensity and chromatic composition of the light beam to form the image on the retina.

In some embodiments, at least one adjustable deflector of the deflector arrangement is configured and operable as a pupil position beam deflector for affecting the lateral deflection of the propagation path of the light beam towards the eye (relative to one or two lateral axes perpendicular to the propagation path of the light beam to the eye). In various embodiments, the lateral deflection of the propagation path is achieved by changing the deflection angle of the pupil position beam deflector and/or by linear translation of the position of its effective deflection surface. In case the lateral deflection of the propagation path is achieved by changing the deflection angle of the pupil position beam deflector, the pupil position beam deflector may be located within an optical relay of the system. In case the lateral deflection of the propagation path is achieved by translating the deflection surface of the pupil position beam deflector, it may be located upstream or downstream from the optical relay with respect to a propagation direction of the light beam.

In some embodiments, at least one adjustable optical deflector is configured and operable as a gaze direction beam deflector for affecting adjustably the angular orientation of the propagation path of the light beam towards the eye. In various embodiments the angular deflection of the propagation path is achieved by linear translation of the position of the effective deflection surface of the gaze direction beam deflector and/or by changing its deflection angle. In case the angular deflection of the propagation path is achieved by linear translation of the position of the effective deflection surface of the gaze direction beam deflector, the gaze direction beam deflector may be located within an optical relay of the system. In case the lateral deflection of the propagation path is achieved by changing the deflection angle of the gaze direction beam deflector, it may be located upstream or downstream from the optical relay with respect to a propagation direction of the light beam.

In some embodiments the same adjustable deflector is configured and operable for adjusting degrees of freedom of the propagation path associated with both the angular deflection and the lateral deflection of the propagation path. For instance, translation of the deflection surface of the adjustable beam deflector affects the lateral deflection of the propagation path, and changing the deflection angle of the deflector affects the angular orientation of the propagation path, or vice versa.

In some embodiments the eye projection device includes an eye tracking module configured and operable to measure eye positioning data indicative of a gaze direction and a lateral position of the eye for use in the adjustment of the propagation path towards the eye. The eye tracking module may for example include:

- a tracking light port configured and operable for providing a tracking light beam directed to propagate along the general optical path of the optical assembly of the system while interacting with the one or more adjustable optical deflectors. The incidence of the tracking light beam on the eye gives rise to a reflected light beam associated with a reflection of the tracking light beam from the eye for back propagation through the optical assembly.
- one or more sensors optically coupled to the general optical path at two or more different locations there along and adapted for receiving the reflected light beam and measuring one or more property of propagation of the reflected light beam at the two or more different locations; and
- an eye tracking controller connectable to the one or more sensors and to one or more adjustable optical deflectors. The controller is adapted to receive from the one or more sensors readout data indicative of the at least one property of propagation of the reflected light beam at the two or more different locations, and process the readout data to determine the eye positioning data. In some embodiments the eye positioning data is indicative of a deviation between the gaze direction of the eye and the orientation of the propagation path of the light beam towards the eye, and a deviation between the lateral position of the pupil of the eye and the propagation path.

In some embodiments the adjustable optical deflectors include at least two such deflectors arranged successively along the optical path of the system to define two respective deflection stages of the optical path, associated with deflection of the optical path by the two adjustable optical deflectors. The two or more sensors are located at different locations and optically coupled to the general optical path at these two deflection stages respectively. The controller may be configured and operable for generating operative instructions for each respective adjustable optical deflector based on the corresponding property of propagation measured from the respective deflection stage of the optical path associated with these respective adjustable optical deflectors.

For example, the measured property of propagation may be the lateral off axis deviation of the propagation of the reflected light beam from a predetermined nominal position, and the controller may be adapted to process the readout data from the sensor to determine a location of incidence of the reflected light beam on the sensor and determine a deviation between the location of incidence and a predetermined nominal position on the sensor, and thereby determine the property of propagation of the reflected light beam.

In some embodiments the controller includes one or more servo loops whereby each servo loop is configured and operable to connect a respective adjustable optical deflector of the two adjustable optical deflectors to a corresponding sensor of the one or more sensors for generating the operative instructions for operating the respective adjustable optical deflector based on readout data obtained (or based on the property of propagation measured) from the corresponding sensor.

In some embodiments the one or more sensors include a gaze direction sensor comprising a plurality of light detectors. The gaze direction sensor is arranged to collect the reflected light beam from the general optical path at a deflection stage positioned after (downstream) of the location of interaction of the reflected light beam with the gaze direction beam deflector which is responsible for adjusting the angular orientation of the propagation path. Accordingly, the readout data/information from the gaze direction sensor is indicative of angular deviation between a gaze direction of the eye and the propagation path towards the eye.

In some embodiments the eye tracking controller includes a gaze direction controller connectable to the gaze direction sensor and to the gaze direction beam deflector. The gaze direction controller is configured and operable for operating the gaze direction beam deflector to minimize the deviation of the reflected light from a center of the gaze direction sensor, to levels below a predetermined threshold.

In some embodiments the gaze direction controller includes a tremor filtration module adapted to process the readout data from the gaze direction sensor and filter out angular deviations of the gaze direction, which are associated with tremor movement of the eye. The tremor filtration module may be associated with tremor deviation threshold and may be configured and operable for processing the readout data to continuously monitor the angular deviations of the gaze direction and operate in an open servo loop for angular deviations lower than the tremor deviation threshold thereby not compensating for deviations associated with tremor movements, and operate in closed servo loop for angular deviations larger than the tremor deviation threshold thereby compensating for deviations which are not associated with tremor movement of the eye.

In some embodiments the tracking light port is operable for outputting the tracking light beam as a modulated light beam. The eye tracking controller includes at least one of the following: a phase locking module adapted to phase lock the readout information from the one or more sensors with a modulation of the tracking light beam thereby suppressing noise associated with IR light clutter sensed by the sensors; and a bandpass filter tuned to a specific wavelength of the tracking light beam.

In some embodiments the one or more sensors include a pupil position sensor arranged/optically coupled to the optical path for collecting the reflected light beam from the eye, at a deflection stage located after the interaction location between the reflected light beam and the pupil position beam deflector which is responsible for adjusting the lateral position of the propagation path. Accordingly, the readout information from the pupil position sensor is indicative of lateral deviation between a position of the pupil of the eye and the propagation path of the light beam towards the eye.

The eye tracking controller may include a pupil position controller connectable to the pupil position sensor and to the pupil position beam deflector. The pupil position controller is adapted to process the readout data/information from the pupil position sensor and operate the pupil position beam deflector to at least partially compensate for the lateral deviation between the position of the pupil of the eye and the propagation path.

In some embodiments the eye projection device includes two eye projection systems as described above for projecting images to both of the user eyes respectively: a first eye projection system for projecting images to one of the user eyes and a second eye projection system for projecting images to the other eye. In such embodiments, the pupil position controller may be connectable to the pupil position sensor of the first eye projection system and to the second pupil position sensor of the second eye projection system and is adapted to detect "common mode" shifts of the positions of the pupils of both of the user eyes and to differentiate between shifts associated with eye movements and shifts associated with movement of the eye projection device relative to the eyes.

According to another broad aspect of the present invention, there is provided an eye tracking module comprising:
   a tracking light port configured for providing a tracking light beam;
   an optical assembly configured for directing the tracking light beam to propagate along a propagation path towards an eye, whereby the optical assembly includes at least two adjustable optical deflectors configured and operable for adjusting an angular orientation and a lateral position of the propagation path towards the eye;
   at least two optical sensors optically coupled to a general optical path of the optical assembly in respective association with the at least two adjustable optical deflectors, for respectively sensing reflected light beam which is being reflected back from the eye in response to the directing of the tracking light beam towards the eye; and
   an eye tracking controller connectable to the at least two optical sensors to receive readout information therefrom; the eye tracking controller is adapted to process the readout information to determine data indicative of lateral and angular deviation of the propagation path from a pupil position and a gaze direction of the eye respectively.

According to yet another aspect of the present invention there is provided an optical assembly for directing a light beam from an eye projection device to the user eye. The optical assembly includes at least two adjustable optical deflectors arranged along a general optical path. The at least two adjustable deflectors are configured to provide at least three and typically at least four degrees of freedom in adjusting a propagation path of the light beam towards the eye. Typically, two of the degrees of freedom are associated with compensation for angular changes in a gaze direction of the eye, and at least one or two of the degree of freedom provides for compensating over variations in a relative position of the eye projection device with respect to the eye.

In accordance with yet another broad aspect of the present invention there is provided an eye projection device comprising an eye projection system configured for projecting images directly on an eye retina, the eye projection system comprising:

(i) an image projection module for projecting an image on a retina of an eye, including a light module adapted for outputting a light beam to be projected on the retina and an image light modulator arranged along a general optical path of the light beam and adapted to modulate the light beam to form the image on the retina; and (ii) an optical assembly for directing the light beam to the eye, the optical assembly comprising at least two angularly adjustable deflectors arranged along the general optical path, the at least two of angularly adjustable deflectors are configured to provide at least four degrees of freedom in adjusting propagation path of the light beam towards the eye, wherein two of the degrees of freedom are associated with compensating for angular changes in the gaze direction of the eye; and two of the degree of freedom provides for compensating over variations in a relative position of the eye projection device with respect to the eye.

In accordance with yet another broad aspect of the present invention there is provided an eye tracking module comprising:

(i) An optical module defining a general optical path for propagation of light towards an eye. The optical module includes:
  a. a gaze direction beam deflector configured and operable to adjustably deflect the general optical path in two angular dimensions to compensate for variations in the gaze direction of the eye.
  b. an optical relay including at least two spaced apart optical elements defining a principal focus plane between them; and
  c. a pupil position beam deflector located at the principal plane and configured and operable to adjustably deflect the general optical path in two lateral dimensions to thereby compensate for variations in a lateral position of the pupil of the eye;

(ii) an IR light source that is configured and operable for outputting an IR beam directed to propagate along the general optical path while interacting with the gaze direction beam and the pupil position beam deflector.

(iii) at least two optical sensors. Each optical sensor includes a plurality of IR light detectors (e.g. quadrant sensors). The at least two optical sensors arranged to collect reflected IR light, which is associated with the IR beam being reflected back from a retina of the eye. The at least two optical sensors include:

a. a pupil position sensor that is arranged to detect the reflected IR light after it interacts with the pupil position beam deflector; and
  b. gaze direction sensor arranged to collect the reflected IR light after it interacts with the gaze direction beam deflector; and (iv) an eye tracking controller that is connectable to the at least two optical sensors to receive readout information therefrom. The eye tracking controller is adapted to process the readout information to determine data indicative of lateral deviation in a pupil position of the eye from the general propagation path and determine data indicative of angular deviation in a gaze direction of the eye from the general propagation path.

In some embodiments of the present invention the IR source of the eye tracking module is operable for outputting the IR light beam as a modulated light beam. In turn, the eye direction controller includes a phase locking module that is adapted to phase lock the readout information from at least one of the optical sensors with a modulation of the IR light beam, and thereby suppress noise associated with IR light clutter sensed by at least one of the optical sensors.

It should be noted that in the following description the terms longitudinal and lateral axes/directions are used to designate axes or direction in a local coordinate system of light propagating along an optical/propagation path. The lateral coordinates relate to two perpendicular axes which are orthogonal to the propagation direction of the light and the longitudinal coordinate is aligned with the propagation direction.

The phrases deflection or deflectors are used herein to designate any optical module which affects/changes the direction of light by any physical mechanism including and not limited to refraction, reflection, and diffraction. To this end the term adjustable optical deflectors also refers to adjustable deflectors or adjustable beam deflectors, and these terms are used herein to designate a type of deflector, such as electro-optical deflector or acousto-optical deflector and/or adjustable mirror whose light deflection properties can be controlled (e.g. by applying thereto proper electrical, acoustical or any other type of control signal).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3B to 3D are flow charts illustrating methods of monitoring and tracking the location and the line of sight (gaze) of an eye or of another optical surface/system.

FIG. 3E is a diagram illustrating in self explanatory manner a flow of a servo loop according to an embodiment of the invention which is used for monitoring/tracking the location and/or the line of sight of an eye.

FIG. 4 illustrates glasses furnished with an eye projection device according to an embodiment of the present invention.

DETAILED DESCRIPTION OF EMBODIMENTS

Figure 1A:
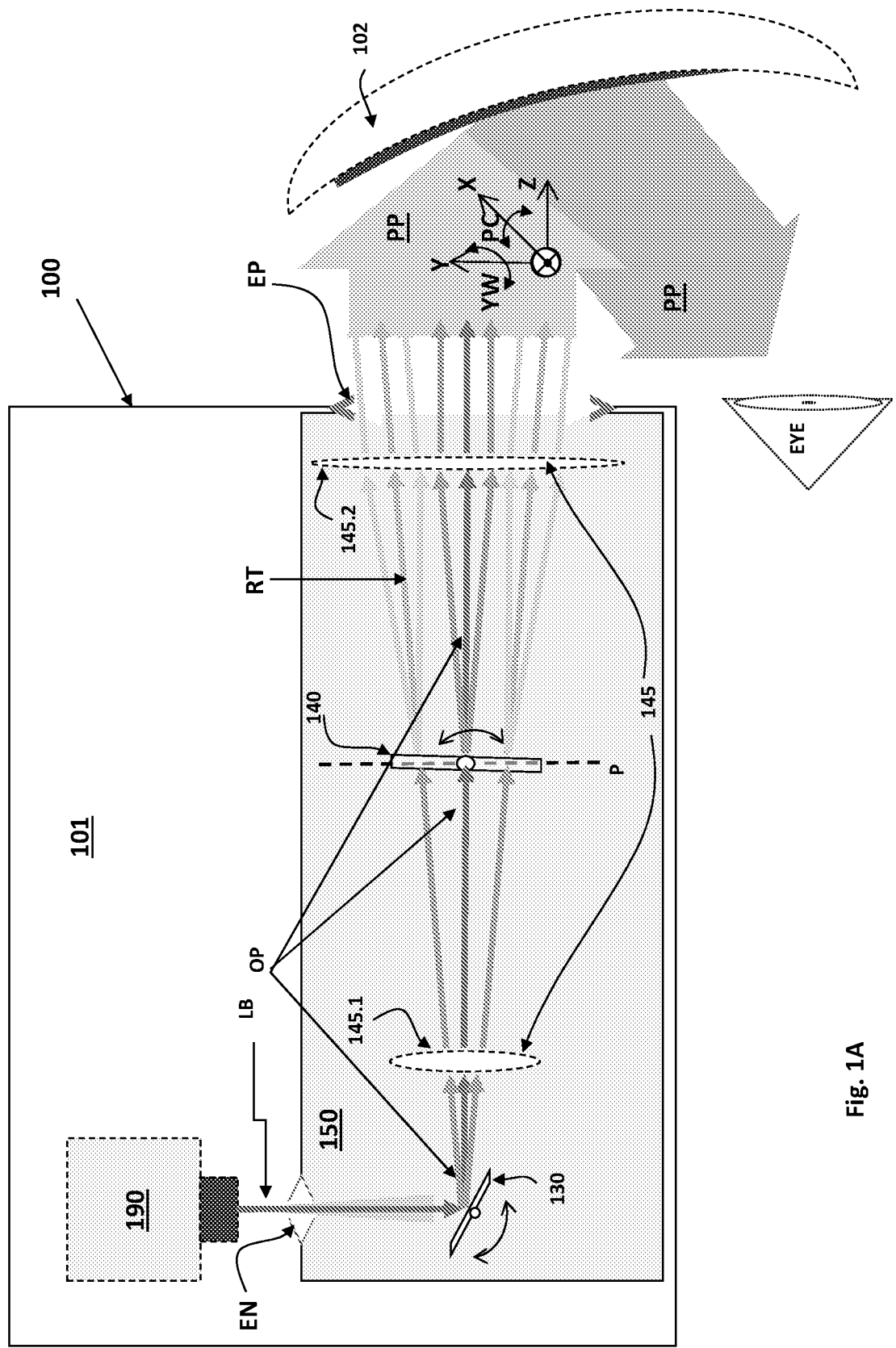
FIGS. 1A to 1F are block diagrams schematically illustrating eye projection devices according to several embodiments of the invention.

Reference is made together to FIGS. 1A to 1F which are block diagrams illustrating schematically an eye projection device 100 according to six embodiments of the present invention. It is noted that, for clarity, common elements/modules and/or element/modules having similar/like functionalities are designated by the same reference numerals in all the figures of the present application.

The eye projection device 100 comprises an eye projection system 101 configured for projecting images directly on a retina of an eye, EYE. The eye projection device 100 may be for example a part of augmented or virtual reality glasses (spectacles) and may include two eye projection systems, such as the eye projection system 101, each used for projecting a light beam LB (e.g. a light beam encoding image(s)) onto a retina of a different one of the human eyes. For clarity, only one eye projection system 101 is specifically shown in the figures.

The eye projection system 101 includes an optical assembly 150 defining a general optical path OP of light propagation therein (e.g. in between an entrance optical-port/pupil EN thereof and an exit optical-port/pupil thereof EP). The optical assembly 150 includes a deflector arrangement located in between the entrance and exit ports, EN and EP, and including one or more adjustable optical deflectors (e.g. 130 and/or 140) arranged along the general optical path OP and configured to define an adjustable propagation path PP of the light beam after it exists from the exit port/pupil EP to propagate in between the optical assembly 150 and the eye EYE.

It should be noted that the phrases entrance port/pupil and exit port/pupil EP do not necessarily designate a physical element of the system and are used herein to designate certain planes/apertures (e.g. virtual plane and/or optical surface) which intersect the optical path OP (e.g. being perpendicular to the optical path) and across which light respectively enters and exists the optical assembly.

Generally, according to the present invention, the optical deflectors (e.g. 130 and/or 140) are configured with at least three adjustable deflection parameters, e.g. which may be associated with adjustable deflection angles of the optical deflectors relative to one or two axes of rotation and/or associated with adjustable translation of their deflection positions along the general path of the optical assembly. The optical assembly 150 (e.g. the deflectors arrangement thereof) is configured such that the at least three adjustable deflection parameters affect deflection of the propagation path PP to provide at least three degrees of freedom in adjusting the propagation path PP of the light beam LB towards the eye EYE. According to the technique of the invention, at least two of the degrees of freedom which are controlled by the deflection parameters of the deflectors are associated with two angular orientations, pitch PC and yaw YW, of the propagation path PP to the eye. This allows for adjusting the deflection parameters of the deflectors (operation of the deflectors) to adjust the angular orientation of the propagation path PP towards the eye so as to compensate over angular changes in a gaze direction of the eye EYE. Additionally, according to the technique of the invention, at least one of the degrees of freedom (typically two degrees of freedom) is associated with a lateral deflection of the propagation path PP. This allows adjusting the deflection parameters of the deflectors to compensate over variations in the relative lateral position of the projection system 101 relative to the eye EYE.

Typically, the deflector arrangement of the optical assembly 150 includes at least two adjustable deflectors 130 and 140, whereby the deflectors are arranged in a spaced-apart relationship to successively interact with the light beam LB entering the optical assembly 150 and define the general optical path OP thereof.

Figure 1B:
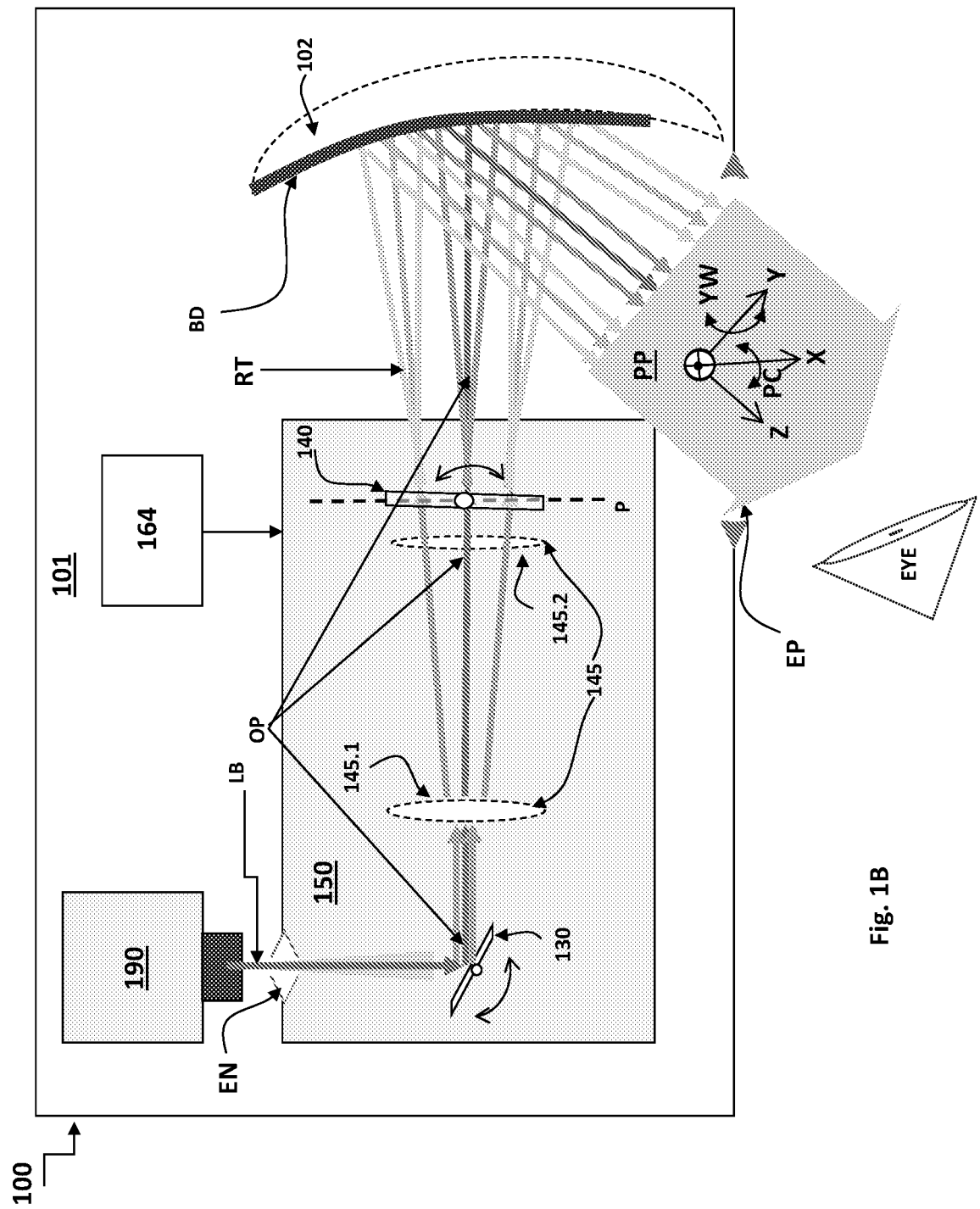
Figure 1C:
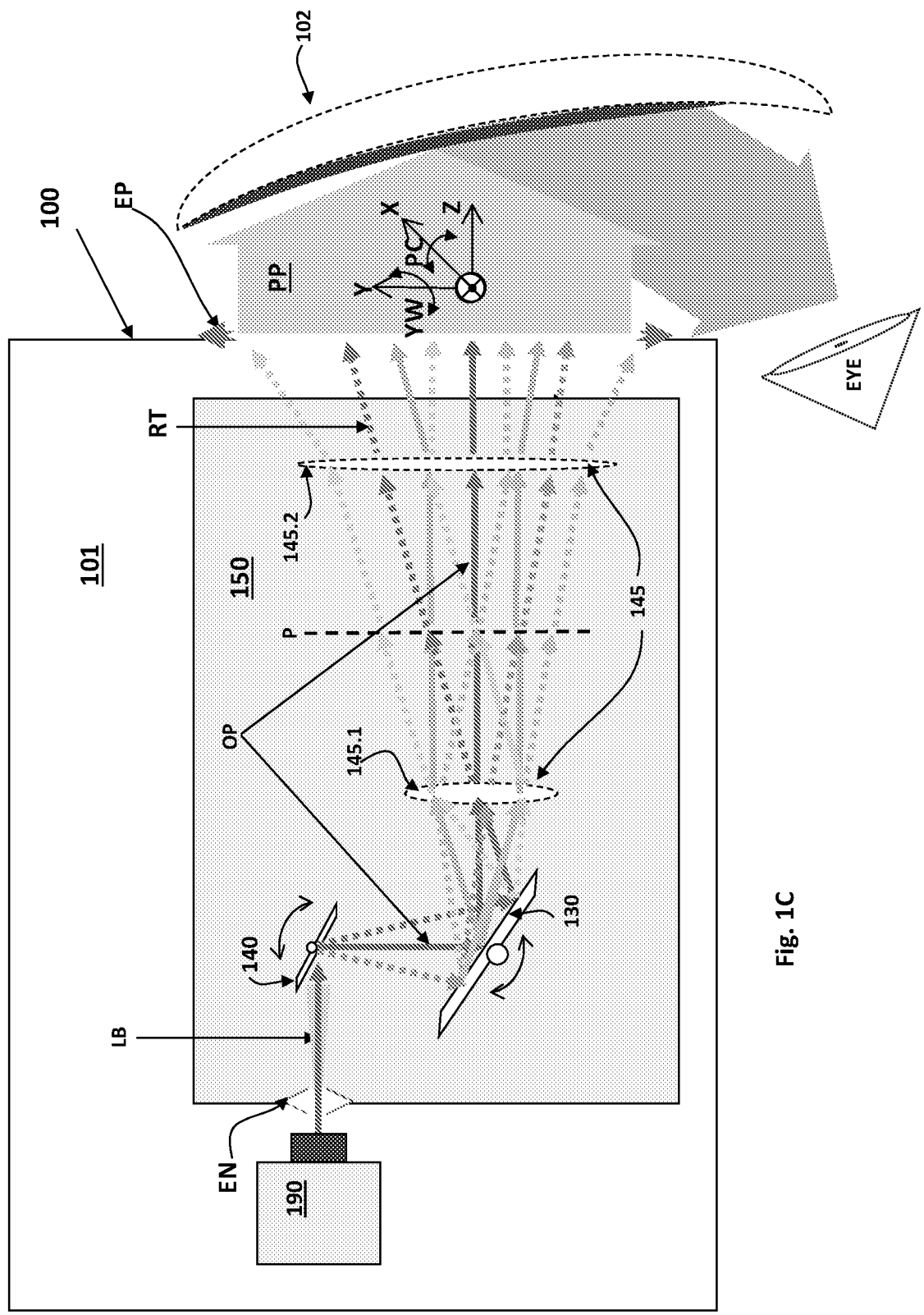
Figure 1D:
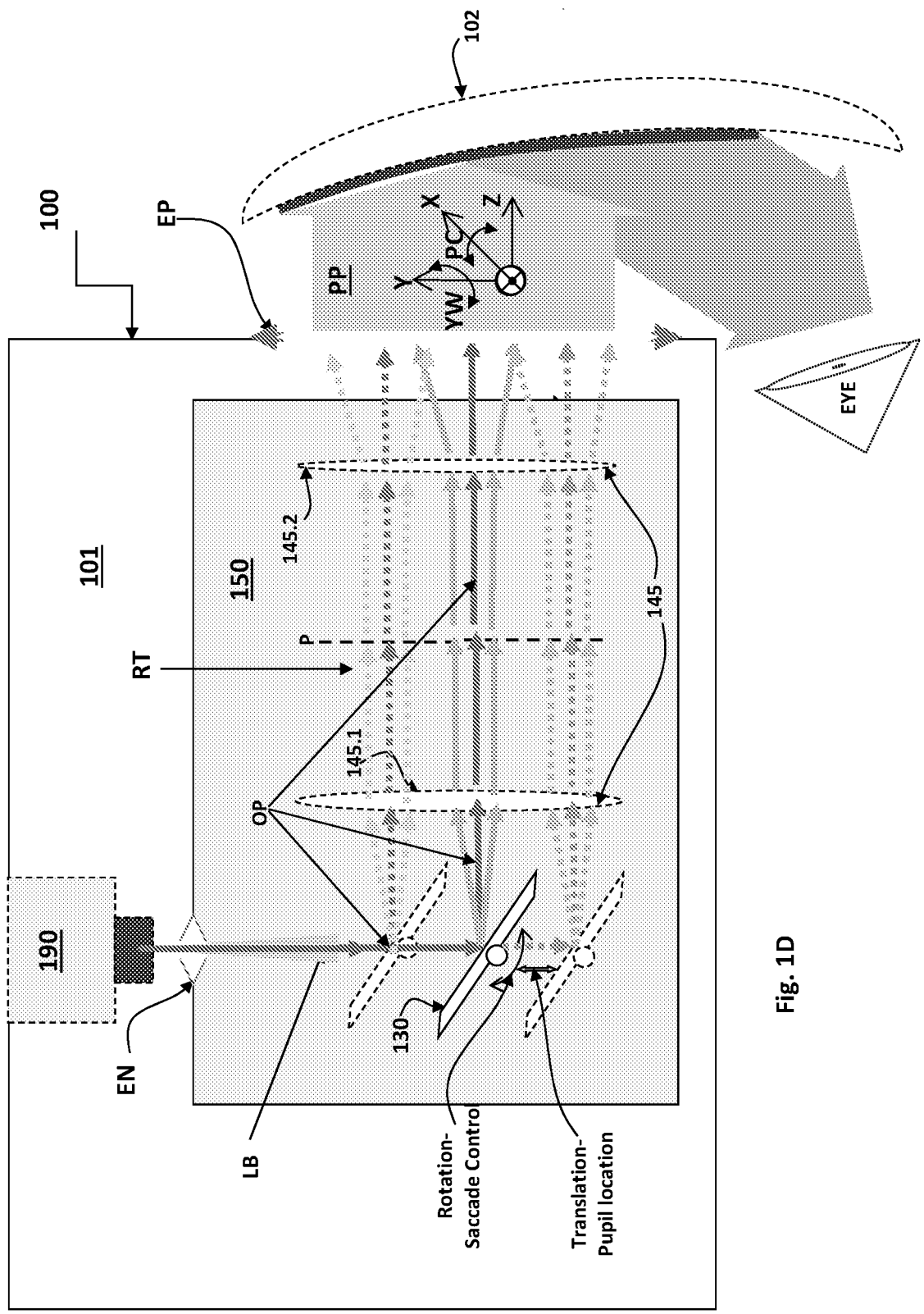

However, as for example illustrated in FIG. 1D, in some implementations where a control over only three degrees of freedom of the propagation path PP is required, a single adjustable deflector 130 having three adjustable deflection parameters may be included in the optical assembly. In the example of FIG. 1D the three adjustable deflection parameters of the single adjustable deflector 130 include displacement/translation of the deflector 130 along the optical path OP, and adjustment of the deflection angle of the deflector 130 in two dimensions (relative to or about two axes of rotation X and Y). In this example the deflector 130 is arranged in the optical assembly 150 such that these three deflection parameters provide control over the angular orientation of the propagation path PP with respect to two angles/rotation-axes thus enabling compensation over changes in the pitch and yaw of the gaze direction of the eye EYE and compensation over the relative vertical position of the eye EYE or the relative horizontal position of the eye EYE, relative to the eye projection system 101. The latter allows for compensating over one of variations in the inter-pupil distance between different people or compensation over vertical displacement of the eye projection device 100 relative to the pupil of the eye EYE.

Typically, as also exemplified in FIGS. 1A, 1B, 1C, 1E and 1F, the optical assembly is implemented with two or more adjustable optical deflectors (e.g., 130 and 140) having at least one additional deflection parameter, thereby defining at least four deflection parameters providing adjustment of at least four degrees of freedom of the propagation path PP, whereby two of the degrees of freedom provide for compensating over angular, pitch and yaw changes in the gaze direction of the eye, and two degrees of freedom provide for compensating over variations in a relative, vertical and horizontal, lateral positions of the projection system 101 relative to the eye EYE with respect to two spatial lateral axes (e.g. X and Y).

In some embodiments the eye projection device 100 includes a beam direction controller 164 (hereinafter also referred to just as controller) adapted to receive data indicative of the changes in the gaze direction of the eye and/or of changes in the relative lateral position of the eye projection system 101 relative to the eye, and configured and operable to adjust the deflection parameters of the adjustable optical deflectors, 130 and/or 140, in accordance with that data, so as to direct the light beam to be incident on a specific location on a retina of the eye irrespective of variations in the gaze direction of the eye and irrespective of variations in the vertical (e.g. Y axis) or horizontal (e.g. X axis) lateral position(s) of the eye projection system 101 relative to the eye EYE.

In this connection it should be understood that in some implementations of the invention (e.g. implementations similar to those illustrated in FIGS. 1A, 1D, 1E and 1F), the optical assembly 150 (e.g. the arrangement of deflectors therein) is configured such that each adjustable deflector parameter of the deflectors 130 and/or 140 is responsible for affecting a certain specific degree of freedom of the propagation path PP (being one of the pitch and yaw orientations of the propagation path or one of the horizontal and vertical displacements of propagation path PP), while without affecting other degrees of freedom of the propagation path PP. Accordingly, in such embodiments, the controller 164 may be adapted to compensate over a change in the gaze direction of the eye EYE by adjusting the respective deflection parameter of the respective deflector 130 or 140 without adjusting/changing the state of other deflectors or other deflection parameters thereof. In that case the controller 164 may also be adapted to compensate over a change in the relative lateral position of the eye EYE or pupil thereof by adjusting the corresponding deflection parameter of the respective deflector, 130 or 140, without adjusting/changing the state of other deflectors or other deflection parameters thereof.

In other words, in some embodiments of the present invention, such as illustrated in FIGS. 1A, 1D, 1E and 1F, the deflection parameters of the adjustable deflectors responsible for adjusting the orientation (pitch/yaw) of the propagation path PP to match gaze direction of the eye EYE are decoupled from adjustment of the lateral position of the propagation path PP (namely, they substantially not affect the lateral position of the propagation path PP); and/or vice versa the deflection parameters of the adjustable deflectors responsible for adjusting the lateral (X or Y) position of the propagation path PP to match the location of the pupil of the eye EYE are decoupled from adjustment of the orientation of the propagation path PP. This feature, which is implemented in certain embodiments of the invention, is referred to in the following for clarity and conciseness as the "decoupling feature". Embodiments implementing the decoupling feature provide several advantages. For once it is noted that generally the gaze direction of the eye EYE changes much more rapidly/frequently (e.g. sometimes more than 10 times per second with typical accelerations of 2000 to 4000 deg/sec$^2$ and durations between 50 and 400 milliseconds) than the position of the pupil (whose changes occur in a time scale of hundreds of milliseconds and are largely caused by eye-device relative position). In this connection, the following should be understood: The saccades are pure eye motion which are defined by the user's visual and cognitive load and therefor happen a few times a second with the above mentioned parameters. The position of a pupil is mainly lateral movements and are defined by eye to device relative position. Parameters like ambient vibrations, device movement (slippage) are the largest contributors. These defined by relatively low frequency and a "common mode" which means that there is somewhat similar motion on bough eyes. Therefore decoupling the deflection parameters controlling the adjustment of the propagation path to the pupil location from those adjusting the propagation path, is much more cost effective since in that case fastly adjustable optical deflectors/deflection parameters thereof are required only for the deflection parameters associated with the orientation of the propagation path (associated with the gaze direction), while adjustable deflectors/deflection-parameters for adjusting the pupil location may be in that case much lower and thus much more cost effective.

A prominent advantage of such a decoupling approach is that it enables utilizing optical assembly 150 with substantially reduced Theta*D parameter, e.g. a parameter indicating the product of the maximal deflection angles Theta of the adjustable deflectors and the deflectors' characteristic dimensions (diameters) D, which always possesses a challenge. For instance, adjustable deflectors 130 and/or 140 with significantly smaller Theta*D parameter can be used in the embodiments of FIGS. 1D and 1E by laterally moving small aperture deflectors/mirrors (small Theta*D product) instead of having a large deflector/mirror with large Theta*D product and instantaneously moving the beam around. Additionally, in embodiments implementing the decoupling feature of the invention, the controller 164 may be configured and operable to adjust each deflection parameter independently based on the data indicative of the change in the respective degree of freedom (gaze direction/pupil location) of the eye that was changed, while obviating a need for using referenced data associating complex adjustment of plurality of deflectors/deflection parameters for compensating over a change in one of the degrees of freedom.

In some embodiments of the present invention the eye projection system 101 includes an optical relay 145 (e.g. operable for relaying beam convergence from one optical surface to another optical surface). The optical relay 145 may for example include at least two optical elements or two groups of optical elements, 145.1 and 145.2, which have respective optical powers, and which are positioned along the optical path OP of the optical assembly 150 (of the light beam LB propagation path) forming/defining a principal plane P between them. It should be understood that in the following the term optical elements (145.1 and/or 145.2) used with reference to the optical relay 145 designates single element or group(s) of plurality of elements with optical powers, e.g. two groups including two or more optical elements in the group. It should be noted that the phrase principal plane P of an optical assembly/element is used herein to designate a real or virtual/hypothetical plane of the optical assembly/element (e.g. of the lens/deflector system) at which all the refraction/reflections of various rays interacting with the optical assembly/element (or of their virtual extensions) can be considered to occur.

In the examples illustrated in all of the FIGS. 1A to 1F, the eye projection device includes an optional spectacle's lens 102. The eye projection system 101 is shown to be optically coupled to the spectacle's lens 102 such that light from the eye projection system 101 is directed along a propagation path PP towards the eye EYE by at least one surface (e.g. reflective/partially reflective surface) of the spectacle's lens 102. To this end, the optical system may be located behind the eye (e.g. near the ear/cheek of a user or at a handle part of the spectacles). An example of the reflective/partially-reflective surface of the lens 102 can be given as a curved surface such as elliptical mirror. The reflective/partially-reflective surface of the lens 102 is positioned along the optical/propagation path OP/PP such that it focuses at the location of an optical pivot point of the scanning mirror/deflector 120 (see in the following the scanning mirror 120 is a deflector of the protector which is responsible for scanning/moving the light beam LB on the retina, e.g. to draw an image thereon), where the location of the pivot point may be a real location of the pivot of the scanning mirror or a virtual location of the pivot optically relayed from the real location by an optical relay (e.g. 145). Accordingly, the pivot point of the scanning deflector 150 coincides with the focus of the elliptical mirror 102 thus creating a fan of rays at the system's exit pupil or conjugate plane being the second focus of the system/optical assembly.

According to some embodiments of the present invention the eye projection system 101 includes an image projection module 190 configured and operable for outputting an image projection light beam LB (e.g. light beam modulated/patterned with image information) to be projected on the retina of the eye EYE for generating an image thereon. The optical assembly/system 150 is configured and operable for directing the image projection light beam LB to the eye EYE (e.g. in some cases directing the light beam LB to reach the eye via the spectacles lens 102).

It should be noted that optical assembly 150 of the present invention, which includes eye tracking optical modules/deflectors (e.g. the gaze direction beam deflector 130 and the pupil position beam deflector 140 and for example including related optics such as 145), can be implemented (configured and operable) as standalone eye tracking system (e.g. which can be used independently from the image projection module 190).

Turning now specifically to FIG. 1A, the optical assembly 150 includes an adjustable deflector arrangement including at least two adjustable deflectors 130 and 140, which are angularly adjustable deflectors enabling control/adjustment of their deflection angle(s). The two angularly adjustable deflectors, 130 and 140, are arranged in a spaced-apart relationship along the general optical path OP of the optical assembly. The two angularly adjustable deflectors 130 and 140 may each include for example two dimensional angularly adjustable deflector(s), which may be operable by controllable reflection, refraction or diffraction and which may be configured for example as: a single mirror mounted for actuation in two dimensional pivotal/rotational/tilt axes; and/or an electro-optical two dimensional angularly adjustable deflector; and/or acousto-optical two dimensional angularly adjustable deflector (the double pass system is relevant only for the acousto-optical layout and intended to increase the deflection angle or diffraction efficiency); and/or a pair of one dimensionally adjustable deflectors (such as pair of one dimensionally adjustable mechanical deflectors, such as tiltable-mirrors, and/or electro-optical-deflectors and/or acousto-optical deflectors and/or wedge plates) arranged with different/orthogonal tilt/deflection axes along the optical path OP.

The at least two angularly adjustable deflectors are arranged at proper locations along the optical path OP such that they are configured and operable for providing at least three, and typically at least four, degrees of freedom in adjusting propagation path PP of the light beam LB towards the eye EYE. As indicated above, the two of the degrees of freedom are associated with compensating for angular changes in the gaze direction of the eye EYE (compensating over pitch and yaw changes in the gaze direction), and at least one degree of freedom, typically two degrees of freedom, provide for compensating over variations in a relative lateral position of the eye projection device 100 relative to the eye EYE; e.g. variations in the relative lateral (vertical/Y-axis and/or horizontal/X-axis) position(s).

In the specific example illustrated in FIG. 1A, the at least two angularly adjustable deflectors 130 and 140 are two dimensionally angularly adjustable mirrors. More specifically, in this example, each deflector includes mechanically/electrically and/or acoustically controllable deflector, e.g. including or functioning similar to an adjustable/tiltable mirror that includes a reflective surface mounted on suitable two dimensional gimbal/pivot(s), allowing to orient the reflective surface in various directions with respect to two axes of rotation. It should, however, be understood that, generally, any suitable light deflection module, whose angular deflection angles can be adjusted in two angular dimensions, may be used. This may include, for example, mechanical deflectors formed by one deflecting optical surface such as mirror mounted on a two dimensional gimbal/pivot, and/or two mirrors/reflective-surfaces each mounted on at least one dimensional gimbal, and/or by electro/acousto optical deflectors, the two dimensional deflection angles of which can be controlled by application of proper voltages, and/or possibly by utilizing suitable acousto-optical (e.g. diffractive) deflection modules and other commonly known deflection systems.

In the embodiment of FIG. 1A, the optical assembly includes an optical relay 145 including at least two optical elements/groups, 145.1 and 145.2, having respective optical powers. The optical elements/groups, 145.1 and 145.2, are positioned along the optical path OP such that the distance between them matches their focal lengths. Accordingly, a principal plane P of the optical relay 145 is defined along the optical path OP in between the optical elements 145.1 and 145.2 distanced from each of the elements 145.1 and 145.2 by its respective focal length. This provides that collimated light beam (such as LB may be) which enters the optical relay 145 from one side thereof and interacting with the first of its optical elements (e.g. optical element/group 145.1) is focused at the principal plane and then, after interacting with the second element of the optical relay (e.g. optical element/group 145.2) and exiting from the other side of the relay 145, it becomes collimated again.

Accordingly, an optical relay such as 145 described above has the properties that lateral deviations of an optical beam outside the relay, from the central optical axis of the relay, are converted to respective angular deviation of the light beam's propagation direction at the principal plane of the relay and vice versa.

The inventor of the present invention has found that this properties of the optical relay can be exploited for adjusting a lateral deflection of the propagation path PP towards the eye (which is located outside the optical relay, in between the optical assembly and the eye) by placing one or more angularly adjustable deflectors within the relay 145 (between the elements/groups 145.1 and 145.2 along the optical path OP). This implementation of the invention is illustrated schematically in FIG. 1A.

Accordingly, in the embodiment of FIG. 1A the angularly adjustable beam deflector 140 is arranged along the optical path OP within the optical relay 145 and is configured and operable as a pupil position beam deflector 140. By controlling/changing its angular deflection state/angle, the direction of the light propagation path OP within the optical relay 145 changes, which in turn deflects the lateral position of the propagation path PP of the light beam to the eye relative to one lateral axis (e.g. X or Y being perpendicular to the propagation path), or perpendicular to the propagation path, or relative to both lateral axes (X and Y). In other words, the pupil position beam deflector 140 is operable to laterally deflect the location at which the light beam LB exits the exit port EP of the eye projection system 101. This is illustrated by the schematic ray traces RT in FIG. 1A.

In the embodiment of FIG. 1A, the lateral deflection of the propagation path PP is achieved by changing the deflection angle of the pupil position beam deflector 140 being located within the optical relay 145, in one or two dimensions (pitch and/or yaw), so that such change in the deflection angle affects the angular orientation of the general optical path OP within the optical relay and thereby alters the lateral (X or Y) position of the propagation path PP of the light beam outside the optical relay 145 towards the eye EYE. To this end, in some embodiments, the pupil position beam deflector 140 may be one dimensional angularly adjustable deflector having a deflection angle angularly adjustable with respect to one angular orientation (pitch or yaw), thus having one controllable deflection parameter controlling the lateral position of the propagation path PP with respect to only one of the lateral axes X or Y. Alternatively, the pupil position beam deflector 140 may be a two dimensional angularly adjustable deflector, having deflection angle angularly adjustable with respect to two angular orientations (pitch and yaw), thus having two controllable deflection parameters controlling the lateral position of the propagation path PP with respect to both lateral axes X and Y.

In some embodiments, the pupil position beam deflector 140 is located at a principal plane of the optical relay, such that adjustment of the deflection angle of the pupil position beam alters the lateral position of the propagation path of the light beam to the eye without affecting an angular orientation of the propagation path towards the eye. This thereby implements the decoupling feature of the present invention.

Thus, the pupil position beam deflector 140 can be angularly tilted/rotated to shift the optical path OP of the light beam LB to compensate for variations/changes in the position of the eye EYE relative to the device 100. Contemplating the eye projection system 101 is being furnished on augmented/virtual reality glasses, variations in the relative position between the eye projection system 101 of the eye EYE may be due to differences in the face structure of users using the augmented/virtual reality glasses (e.g. the inter pupil distance between the eyes, and/or the height of the nose bridge); and also this relative position might change when the device's 100 position on the user's face shifts. The pupil position beam deflector 140 can be operated to adjustably deflect light beam LB to enable change/control the lateral position at which the light beam LB exits the exit pupil EP of the eye projection system 101 in one or two lateral dimensions (e.g. the vertical and horizontal lateral directions, Y and X in the figure, which are substantially orthogonal to the propagation path PP). Controlling/shifting the lateral exit position of the propagation path PP from the exit port EP of the system 101 enables to direct the light beam LB towards the pupil of the eye EYE while compensating over variations/changes in a lateral position of the pupil of the eye with respect to the eye projection system 101 (e.g. with respect to its exit port EP).

As illustrated in FIG. 1A, the optical assembly 150 includes another adjustable optical deflector 130, being in this example a two dimensional angularly adjustable, which serves (is configured and operable) as a gaze direction beam deflector. The gaze direction beam deflector 130 is arranged along the optical path OP of the optical assembly such that when its angle of deflection is adjusted (e.g. by angularly tilting/rotating an optical deflection surface thereof), it angularly deflects propagation path PP of the light beam LB towards the eye EYE, shifting its propagation orientation. Accordingly, the gaze direction beam deflector 130 is operable for compensating over angular (pitch and yaw) changes in the gaze direction of the eye EYE.

To this end, in embodiments of the present invention which include optical relay 145, the gaze direction beam deflector 130 may be an angularly adjustable beam deflector (which deflection angle can be adjusted) located outside (upstream or downstream) the optical relay 145 along the optical path OP of the optical assembly 150. This is illustrated in FIGS. 1A to 1F. Accordingly, whether being located upstream from the optical relay 145 or downstream therefrom, an adjustment/change of the deflection angle (deflector's orientation) affects the angular orientation (pitch and/or yaw) of the propagation path PP.

As will be appreciated by those versed in the art after knowing the present invention, the gaze direction beam deflector 130 may be located before/after the placement of the optical relay 145 such that changing its deflection angle does not affect a lateral deflection/position of the propagation path PP towards the eye. Accordingly, such embodiments implement the decoupling feature described above. For example, in certain embodiments the gaze direction beam deflector 130 is an angularly adjustable optical deflector, located before/upstream-from the optical relay 145 at the focal plane of the first optical element/group 145.1 of the optical relay 145, or located after/downstream-from the optical relay 145 at the focal plane of the second optical element/group 145.2 of the optical relay 145, such that varying the angular deflection state/angle of the gaze direction beam deflector 130 affects the angular orientation (pitch PC and/or yaw YW) of the propagation path PP without affecting the lateral (X and/or Y) position of the propagation path PP.

Figure 1E:
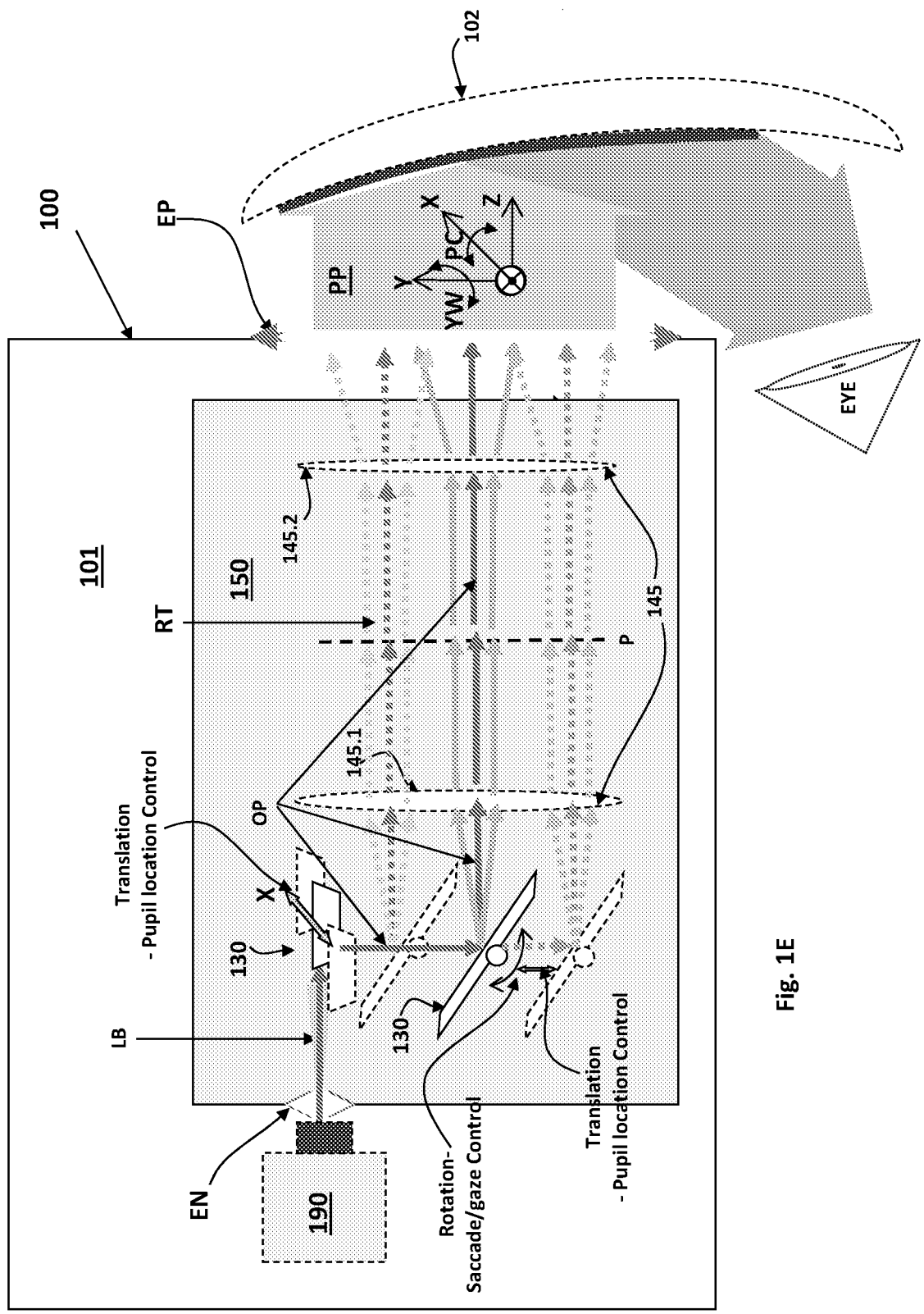
Figure 1F:
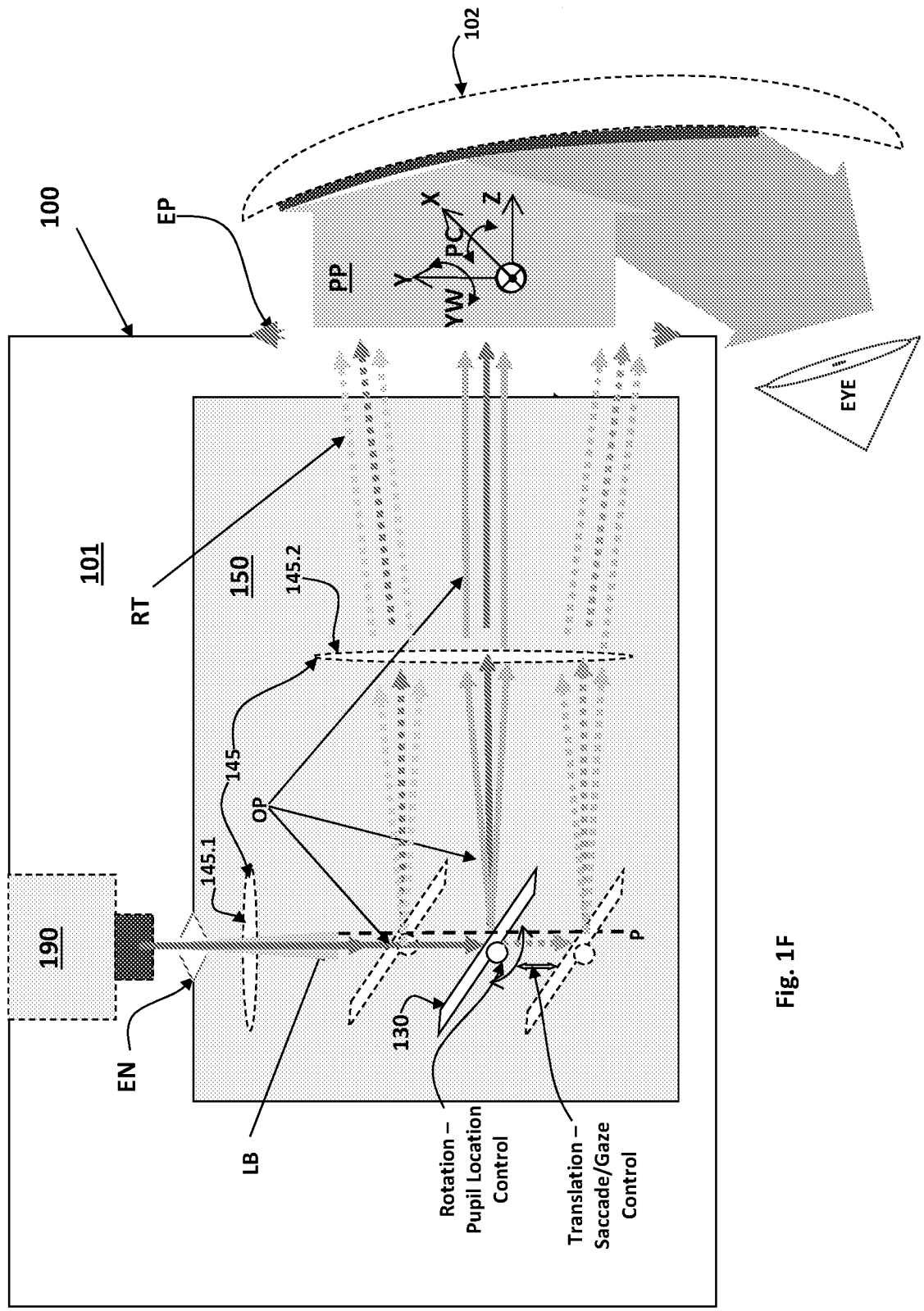

Alternatively, see FIG. 1F, in some embodiments which include an optical relay 145, the gaze direction beam deflector 130 may be a translatable adjustable beam deflector located along the optical path OP within the optical relay 145, and configured and operable for linear translation such that its interaction with the optical path OP laterally shifts the optical path OP within the optical relay (e.g. deflects the optical path in the X and/or Y directions), thereby affecting the angular orientation of the propagation path PP of the light beam downstream from the optical relay 145. As will be appreciated by those versed in the art after knowing the present invention, in case the gaze direction beam deflector 130 is arranged such that its translation in the optical relay preserves its location on/near the principal plane P of the optical relay 145, the lateral deflection of the optical path OP within the optical relay affected by this translation will be converted to purely angular deflection of the pitch and/or yaw orientation of the propagation path PP downstream the optical relay 145 (with no effect on the lateral deflection/position of the propagation path PP), thus giving rise to decoupling between the angular deflection parameters of the gaze direction beam deflector 130, and the lateral (X, Y) position of the propagation path PP.

In the specific and non limiting example of FIG. 1A, the gaze direction beam deflector 130 is arranged before/upstream-from the optical relay 145, such that it can be operated to angularly control the direction of general optical path OP along which the light beam LB propagates to the eye EYE. It should, however, be noted that in various implementations of the optical arrangement of the eye projection system 101 according to other embodiments of the present invention, the gaze direction beam deflector 130 may also be located at different locations along the optical path OP. For example, the non-limiting examples of FIGS. 1A to 1E may be modified such that the gaze direction beam deflector 130 is placed after the optical relay 145. Indeed, locating the gaze direction beam deflector 130 before the optical relay may be advantageous in terms or the required size/dimensions of the gaze direction beam deflector 130, as placing the gaze direction beam deflector 130 before the optical relay 145 (upstream therefrom) generally allows using much smaller deflector as compared to the case the gaze direction beam deflector 130 is placed after (downstream from) the optical relay 145. This makes the former option preferable for some implementations of the invention since the smaller deflector has generally smaller dimensions and weight and is typically more cost effective.

Thus, the gaze direction beam deflector 130 allows redirecting the angular orientation (pitch PC and/or yaw YW) of the propagation path PP along which light beam LB propagates to the eye EYE, such that the propagation path PP incidents the eye EYE with fixed angular orientation maintained relative to the line of sight LOS (gaze direction) of the eye. Accordingly, when a user of the device 100 changes his gaze direction (changes his line of sight LOS) the gaze direction beam deflector 130 can be operated to shift the optical path OP such that the light beam LB will be directed to the pupil of the EYE with the same orientation as that before the gaze was shifted, and thus be projected/focused on the same location on the retina. The image projected by the light beam LB on the retina is thereby maintained at the same location on the retina even when the user changes his gaze.

Typically, the gaze direction beam deflector 130 is configured as a two dimensionally adjustable deflector, which can be controlled to adjustably deflect the light beam in two angular dimensions so as to compensate for both horizontal and vertical changes in the gaze direction LOS of the eye EYE. Accordingly, the location of an image projected by the eye projection system 101 on the retina may be maintained fixed, irrespectively of horizontal and/or vertical changes in the gaze direction of the eye EYE.

Thus, as described above with respect to FIG. 1A and further below with respect to FIGS. 1B to 1F, the adjustable optical deflectors 130 and 140 provide means for deflecting both the lateral, X and Y, positions and the angular pitch PC and yaw YW orientations of the propagation path PP of the light beam LB to the eye. This allows for compensating over both lateral changes in the position of the eye/pupil EYE and compensating over changes in the line of sight (gaze direction) LOS of the eye, and enables to maintain the projection of an image/light-beam LB at substantially fixed position on the retina, even if the eye-projection device 100 moves relative to the eye EYE, or the user changes his gaze direction LOS. Typically, the pupil position beam deflector 140 provides at least one and typically two degrees of freedom in directing the light beam LB, and the gaze direction beam deflector 130 provides another two degrees of freedom in directing the light beam LB. In total, three or four degrees of freedom including at least one (vertical X) and typically two (X and Y) lateral degrees of freedom, which provide compensation over changes in the pupil position, and two angular degrees of freedom, adjusting the up-down (pitch) PC and left-right (yaw) YW orientation of the beam, for compensating over changes in the gaze direction.

Turning now to FIG. 1B, in some embodiments of the present invention the pupil position beam deflector 140 may also be located and arranged outside the optical relay 145 (or optionally the system may not include the optical relay 145). For instance, the pupil position beam deflector 140 may be placed in proximity to the exit port/pupil EP of the system 101.

The eye projection device 100 illustrated in FIG. 1B is operable similarly as that of FIG. 1A, except for that here the adjustable optical deflector 140 is an angularly adjustable deflector located along the optical path OP after the optical relay 145 (outside the optical relay 145, e.g. not between the optical elements/groups 145.1 and 145.2 of the optical relay 145). Other elements/modules of the eye projection device 100 of FIG. 1B may be configured similarly to the corresponding elements/modules which are illustrated and described herein above and below with respect to FIG. 1A, and therefore these elements will not be described in further details with reference to FIG. 1B.

In the non-limiting example of FIG. 1B, the pupil position beam deflector 140 is configured to operate in conjunction with an additional beam deflector BD (e.g. being a static beam deflector/reflective-surface). Here, the shape/curvature of the reflective/refractive surface(s) of the additional beam deflector BD is configured to convert the angular deflection, by which the pupil position beam deflector 140 deflects the beam LB into lateral shift of the beam LB. In other words, the additional beam deflector BD is configured such that varying/adjusting the deflection orientation of the pupil position beam deflector 140, will affect a lateral shift in the propagation path of the beam LB towards the eye EYE (i.e. will shift the propagation path in the X and/or Y directions shown in the figure), thereby allowing to shift the propagation path of the beam LB so as to track the position of the pupil of the eye EYE. This can be achieved for example by configuring the position and the focal power of the additional beam deflector BD such that its focal plane substantially coincides with the plane at which the pupil position beam deflector 140 is placed.

In the embodiments illustrated in FIGS. 1A and 1B, the beam deflector 140, which is primarily responsible/operable for the lateral deflection of the propagation path PP, is positioned after the beam deflector 130 (which is primarily responsible for the angular deflection of the orientation of the propagation path PP). Even more specifically, in these examples it is positioned within the optical relay 145 (e.g. in between its optical elements 145.1 and 145.2) or after the optical relay 145. Such an arrangement may require the beam deflector 140 to be of considerable size in order for it to cover the angular span of the beam deflector 130, and may therefore be less advantageous in implementations of the present invention in the eye projection system 101 if it is required that the system has compact size and is cost effective.

To this end, FIGS. 1C to 1E illustrate embodiments of the present invention in which the beam deflector 140 primarily responsible/operable for the lateral deflection of the propagation path PP is located before or integrated with the beam deflector 130, and located before the optical relay 145 in case the later is included in the system. In all these embodiments, the beam deflector 130 is configured similarly to that described above with reference to FIG. 1A. More specifically, in all these embodiments the beam deflector 130 is angularly adjustable optical deflector located before the optical relay 145, preferably at the focal plane of the first optical element/group 145.1 of the optical relay 145, and is primarily responsible and operable for adjusting the angular orientation of the propagation path PP.

Turning now to FIG. 1C, in this embodiment of the invention the beam deflector 140, which is primarily responsible/operable for adjusting the lateral deflection of the propagation path PP, is an angularly adjustable deflector positioned along the optical path OP of the optical assembly 150 before/upstream-from the beam deflector 140 (which is primarily responsible/operable for adjusting the angular orientation of the propagation path PP). The beam deflector 140 is an angularly adjustable optical deflector angularly adjustable in one or two dimensions (pitch and/or yaw) for deflecting the lateral position of the propagation path PP with respect to one or two of the lateral axes X and Y. Indeed, as can be seen from the ray trances RT in the FIG.

1C, a change in the angular deflection state/angle of the beam deflector 140 affects the lateral position at which the light beam LB impinges on the beam deflector 130, and accordingly it also affects the lateral position at which the light beam enters the optical relay 145, and therefore affecting the lateral position of the propagation path PP of the light beam after it exits the optical relay 145.

However, as can also be seen from the ray trances RT in the FIG. 1C, changing the angular deflection parameter(s) of the beam deflector 140 not only affects the lateral position at which the light beam enters the optical relay 145 but also affects the propagation direction of the light beam LB (before it enters the optical relay 145) and therefore also affects the angular orientation of the propagation path PP. To this end, in this embodiment although a smaller adjustable optical deflector 140 can be used to control the lateral position of the optical path PP (as compared to the embodiments of FIGS. 1A and 1B, the deflection parameters of the optical deflector 140 are not decoupled from the angular orientation (pitch and/yaw) degrees of freedom of the propagation path PP. Therefore adjusting the deflection parameters of the pupil position deflector 140 to adjust the degrees of freedom associated with the lateral position of the propagation path PP, may also require adjustment of the deflection parameters of the gaze direction deflector 130 to compensate for the effects of the pupil position deflector 140 on the orientation of the propagation path, and vice-versa. This can be achieved for example by utilizing controller 164 properly configured and operable to adjusts the states of both deflectors 130 and 140 in order to compensate for each change of the gaze direction or pupil location of the eye EYE.

However, as indicated above, in some implementation of the present invention it is preferable that the deflection parameters of each of the deflectors 130 and 140 are exclusively associated with adjustment of certain respective degrees of freedom of the propagation path PP. More specifically, it is preferable that the two deflection parameters (associated with the deflection properties with respect to two dimensions) of the deflector 130 are responsible solely for the angular orientation degrees of freedom of the propagation path associated with the pitch and yaw of the gaze direction of the eye, and that the one or two deflection parameters (associated with the deflection properties with respect to one or two dimensions) of the deflector 140 are responsible solely for the lateral position degrees of freedom of the propagation path associated with the vertical and/horizontal position of the eye/pupil. This is an advantage since it allows to specifically configure each of the deflectors to match specific eye-movement/position properties. For instance, this allows for utilizing slow and cost effective deflector 130 for adjusting the lateral position of the propagation path PP to the pupil location and utilizing fast and agile deflector 140 for responding to changes in the gaze direction (e.g. which may include fast tremor or saccade movements).

Reference is now made together to FIGS. 1D and 1E illustrating two embodiments of the present invention which are configured and operable to implement the decoupling feature described above. Additionally, advantageously in these embodiments all of the adjustable deflectors are located before the optical relay 145 and therefore can be relatively small/compact as compared to embodiments in which one of the deflectors is located within or upstream from the optical relay 145.

More specifically, in the embodiments of FIGS. 1D and 1E the adjustable deflector(s) 130 is/are configured and operable as both a gaze direction beam deflector and a pupil position beam deflector wherein translation of the deflector 130 along the optical path of the optical assembly affects the lateral deflection of the propagation path PP and a change in its angular deflection angle(s)/state affects the angular orientation of the propagation path PP.

Even more specifically, in the embodiment of FIG. 1D the optical assembly includes only one adjustable deflector 130 having three adjustable deflection parameters, including two deflection parameters associated with the pitch and yaw deflection orientations of the deflector and one deflection parameter associated with translation (e.g. linear translation) of the deflector along the part of the optical assembly, which is upstream from the deflector 130.

To this end, the deflector 130 is configured such that its optical deflection surface is translatable along the optical path OP such that a translation of the deflector 130 or surface thereof along the optical path OP upstream therefrom affects a lateral displacement (along one axis; e.g. Y) of the optical path OP downstream from the deflector 130 before it enters the optical relay 145 (optional). Accordingly, as illustrated in the ray traces RT in the figure, this affects a lateral translation of the propagation path PP in the corresponding lateral direction/axis (e.g. Y) and therefore provides for compensating over changes in the pupil/eye EYE position in that lateral direction/axis. Thus, in this embodiment the adjustable optical deflector 130 is configured as a pupil position deflector where lateral deflection of the propagation path is achieved by translating the position of the pupil position beam deflector along the optical path OP of the optical assembly to change the intersection location, at which the light beam is deflected from the deflector 130.

Also the deflector 130 is configured such that its angular deflection orientation is adjustable typically in two orientations, pitch and yaw. This operates similarly as described above with reference to the gaze direction beam deflector, whereby changing the angle of deflection of the deflector changes the orientation of the light beam/optical path OP entering the optical relay (optional) and therefore also changes the orientation of the propagation path PP. This allows for compensation over changes in the gaze direction of the eye EYE.

Preferably, in order to decouple the deflection parameters (translation of the deflection surface) adjusting the lateral translation of the propagation path PP from the angular orientation of the propagation path PP, the deflector 130 is configured such that its translation is performed such that the deflection surface of the deflector is maintained near or within the focal plane of the first optical element 145.1 of the optical relay 145. Accordingly, translating the deflector 130 adjusts the lateral position of the propagation path PP while without affecting the angular pitch/yaw orientation of the propagation path PP.

In this example, the optical assembly includes an optical relay, and the deflector 130 is located upstream of the optical relay 130 with respect to a propagation direction of the light beam through the optical assembly. The deflection surfaces of the deflector arrangement (including that of adjustable optical deflector 130 and optionally also those of other adjustable optical deflectors, such as 140 in FIG. 1E) have lateral dimensions substantially not exceeding 7 millimeters.

Turning now to FIG. 1E, here the optical assembly is generally similar to that illustrated in FIG. 1D and described above, except for that here the pupil position beam deflection is achieved by two of adjustable optical deflectors translatable along the optical path OP, as follows: (i) adjustable optical deflector 130 configured and operable as in FIG. 1D to adjust the lateral position of the optical path relative to one lateral axis (e.g. Y) and also to adjust the degrees of freedom associated with the angular orientation of the optical path; and (ii) additional adjustable optical deflector 140 configured and operable such that its optical deflection surface is translatable together with the optical surface of the deflector 130 in the direction along the optical path OP upstream from the deflector 140. Accordingly, such translation affects a lateral displacement along a lateral axis (e.g. X) of the optical path OP downstream from the deflectors 140 and 130.

Hence, the deflector arrangement of the embodiment of FIG. 1E provides the following configuration: Both of the two adjustable optical deflectors 130 and 140 are translatable together along a first lateral axis (e.g. X) to affect the relative lateral deflection of the propagation path PP to the eye with respect to the first lateral axis. One of the two adjustable optical deflectors 130 is independently translatable along a second lateral axis (e.g. Y) to affect the relative lateral deflection of the propagation path to the eye with respect to that second lateral axis. The adjustable optical deflectors 130 are also angularly adjustable, preferably with respect to two angles, such that adjusting the angular deflection state of the deflector adjusts the angular orientation of the propagation path.

Turning now to FIG. 1F, here an optical relay 145 is utilized, and a similar configuration and arrangement of the adjustable optical deflector(s) 130 and/or 140 as that illustrated in any one of FIGS. 1D and 1E and described above is placed within the optical relay 145 (e.g. located at its principal plane P). This interchanges the rolls of the adjustments of the linear translation and angular orientation of the deflectors as compared to those of the examples in FIGS. 1D and 1E. More specifically, here the adjustable beam deflector 130 is an adjustable by linear translation such that translating its location of interaction with the optical path OP affects a lateral shift of the optical path OP within the optical relay 145 (e.g. deflects the optical path in the X and/or Y directions) thereby affecting the angular orientation of the propagation path PP of the light beam downstream from the optical relay 145. In some embodiments, the adjustable beam deflector 130 is arranged such that it is translated while remaining within/near the principal plane P of the optical relay 145, to thereby implement the decoupling feature of the present invention (namely, such that the lateral deflection of the optical path OP within the optical relay affected by this translation is converted purely to angular deflection of the pitch and/or yaw of the propagation path PP without affecting a lateral deflection of the propagation path PP. A lateral (X Y) deflection of the propagation path PP is achieved by adjustment of the angular deflection orientation of the adjustable deflector 130.

It should be understood that, for clarity, in the specific non limiting example illustrated in the figure only a single translatable deflector 130 is shown which enables to reorient the propagation path in only one angular coordinate (pitch or yaw). However, although not specifically illustrated herein for clarity of the figure, typically two translatable beam deflectors are included in this embodiment within the optical relay 145 and are arranged in a similar manner as those illustrated in FIG. 1E so as to enable in this implementation to reorient the propagation path with respect to both pitch and yaw coordinates.

To this end, considering the arrangement of the adjustable optical deflectors 130 and 140 of FIG. 1E placed within the optical relay, in this figure, FIG. 1F, the gaze orientation beam deflection is achieved by translating one or both of the adjustable optical deflectors 130 and 140 as follows: The adjustable optical deflector 130 configured and operable as in FIG. 1F is translated linearly (e.g. along the lateral axis Y) to adjust the orientation of the propagation path PP about one angular coordinate (e.g. pitch orientation of the propagation path PC) and is also angularly adjustable to control/adjust the degrees of lateral degrees freedom of the propagation path PP in one or two dimensions (X and/or Y). The additional adjustable optical deflector 140 is configured and operable such that its optical deflection surface is translatable together with the optical surface of the deflector 130 in the direction (e.g. X) along the optical path OP upstream from the deflector 140. Accordingly, such translation affects a lateral displacement of the optical path OP downstream from the deflectors 140 and 130 along a lateral axis (e.g. X). Since the deflectors are located within the optical relay 145, this affects the adjustment of the yaw YW orientation of the propagation path PP.

Accordingly, the deflector arrangement of the embodiment of FIG. 1F provides the following: At least one adjustable optical deflector 140 and typically both of the two adjustable optical deflectors 130 and 140 together is/are translatable along a first lateral axis (e.g. X) to affect the relative angular deflection of the propagation path PP to the eye with respect to a first ordination coordinate (e.g. yaw YW). One of the two adjustable optical deflectors 130 is independently translatable along a second lateral axis (e.g. Y) to affect relative angular deflection of the propagation path PP to the eye with respect to a second orientation coordinate (e.g. pitch PC). The adjustable optical deflector(s) 130 is/are also angularly adjustable, preferably with respect to one or two angular coordinates to provide respectively one or two dimensional adjustment of the lateral position of the propagation path PP.

It is noted that in the particular and non limiting example illustrated and described with reference to FIGS. 1A, 1D, 1E and 1F the lateral location/position of the propagation path PP of the light beam LB at the exit port EP depends on the adjustment of certain deflection parameters of the adjustable deflectors 130 and/or 140 (e.g. angular adjustment of deflector 140 or linear translation of deflectors 130 and/or 140), while the orientation of the propagation path PP, being the direction-of-propagation of the light beam exiting the exit port EP, is substantially not affected by these deflection parameters, but is controlled by other deflection parameters (e.g. being the angular adjustment of the deflector 130). This provides adjustable deflection parameter that respectively separately controls four degrees of freedom of the propagation path.

It is noted than in some implementations only three degrees of freedom may suffice, the pupil position beam deflector 140 in FIGS. 1A, 1B and 1C may be implemented with one dimensionally adjustable deflector, or the configuration of FIG. 1D may be used. This would allow for varying the lateral position of the beam LB in the vertical direction (e.g. X) to compensate for cases where the augmented/virtual reality spectacles with the device 100 slip down the noise bridge of the user. In such embodiments, compensation over variations in the distance between the eyes (inter pupil distance) of different users might be achieved by other means, such as mechanical means allowing to change horizontal separation between two eye projection systems 101 of the device which are used to project images to each of the user eyes.

It should be understood that, although in the above examples of FIGS. 1A, 1D, 1E and 1F the beam deflectors are respectively arranged and configured such that deflection parameters thereof are operable to separately and independently adjust respective degrees of freedom associated with the lateral position and angular orientation of the optical path OP, in general the deflectors 130 and/or 140 may be configured and arranged along the optical path such that they collectively adjust these three or four degrees of freedom in conjugation, as illustrated for example in FIG. 1C.

Optionally, as illustrated in FIGS. 1A-1F, in some embodiments of the present invention, the eye projection system 101 also includes a beam direction controller 164 that is connectable to the adjustable optical deflectors 130 and 140, and adapted for operating them to direct the optical path OP and the light beams propagating along said path to incident the eye/pupil EYE with the proper location and orientation).

In the above examples the pupil position beam deflector 140 and the gaze direction beam deflector 130 are configured (e.g. arranged along the optical path OP) such that they respectively provide the lateral degrees of freedom (laterally shifting the propagation path PP in the X and Y directions) and the angular degrees of freedom (orienting the pitch and yaw of the propagation path PP). In this case the controller 164 may be adapted to separately operate the optical beam deflectors so as to separately adjust their respective deflection parameters controlling the angular degrees of freedom (up-down (pitch) and/or the left-right (yaw) orientations of the propagation path PP), and separately adjust the respective deflection parameters controlling the lateral degrees of freedom of the propagation path PP.

As indicated above, in some embodiments there is no one-to-one correspondence between the deflection parameters of the beam deflectors 130 and 140 and the above described three of four degrees of freedom, and one or more of the degrees of freedom are adjustable by a combined adjustment of two or more of the deflection parameters in conjugation with one another (e.g. changing any one of the lateral position and/or the angular orientation of the light beam directed to the eye may involve operating/adjusting both deflectors 130 and 140). In such embodiments the controller 164, controlling the beam deflectors, may utilize reference data (e.g. a look-up table) associating each state of both the deflectors 140 and the beam deflector 130 with the lateral (X, Y) and angular (up-down, left-right) shifts that are affected on the light beam in that state. Accordingly, in such embodiments, the deflectors 130 and/or 140 may be operated in conjugation to affect the desired lateral and angular shifts of the light beam LB which are needed for compensation over changes in the gaze direction and in the relative position of the eye EYE. Alternatively, a pre-calibration procedure is applied and fit to a mathematical polynomial model of eye movement is correlated. This can be adapted to several alternative eye movement models, depending on the application requirements.

Figure 1G:
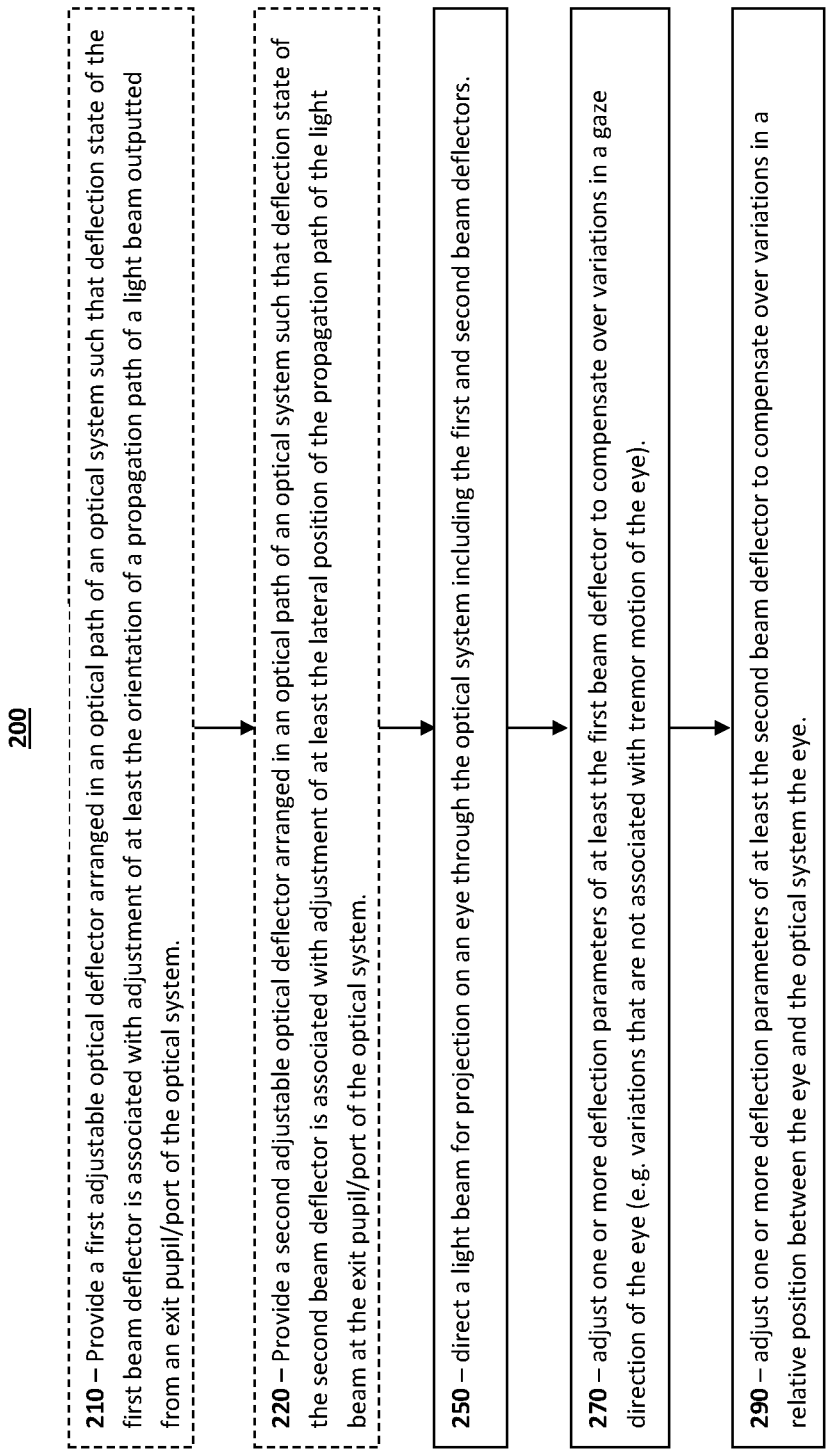
FIG. 1G is a flow chart of method according to an embodiment of the invention for directing a light beam, such as an image projection light beam, towards an eye with compensation over changes in the position and the gaze direction of the eye.

FIG. 1G schematically illustrates a flow chart 200 of a method 200 of the invention for directing a light beam, such as an image projection light beam (e.g. light beam LB), for projection on an eye (e.g. directly on the eye retina). The method may be for example implemented by any one of the eye projection systems 101 illustrated in any one of FIGS. 1A to 1F. More specifically, the method 200 includes optional operations 210 and 220 which are associated with the configuration/elements of the optical path OP of the optical system 150 of the eye projection systems 101 in these figures. Also, the method includes operations 250, 270 and 290, which may be for example carried out by the beam direction controller 164 that is shown in FIGS. 1A to 1F.

More specifically, method 200 includes optional operations 210 and 220 in which first and second adjustable optical deflectors (e.g. 130 and 140 in FIGS. 1A and 1B) are respectively provided being arranged in an optical path of the optical system (e.g. 150). The first beam deflector 130 is arranged such that its deflection state (deflection parameters) is associated with adjustment of at least the orientation of the propagation path PP of the light beam LB being output from the exit pupil/port EP of the optical system 150. The second beam deflector 140 is arranged such that its deflection state (deflection parameters) is associated with adjustment of at least the lateral position of the propagation path PP of the light beam LB at the exit pupil/port EP.

Operation 250 includes directing a light beam (e.g. LB) through the optical system (e.g. 150) including the first and second adjustable optical deflectors. The light beam may be for example an image projection light beam for projecting an image on the eye retina.

In operation 270, the controller 164 and/or optionally a different operator, operates at least the first adjustable beam deflector to adjust its deflection parameters so as to compensate over variations in a gaze direction of the eye (e.g. to compensate/reduce variations that are not associated with tremor motion of the eye). In operation 290, the controller 164 and/or a different operator, operates at least the second adjustable beam deflector to adjust its deflection parameters so to compensate over variations in a relative position between the eye and the optical system 150. To this end, method 200 provides a technique for operating and using the optical system 150 for projecting images directly to a user's eye while compensating over angular and lateral movements of the eye/pupil EYE relative to the optical system 150.

Figure 2B:
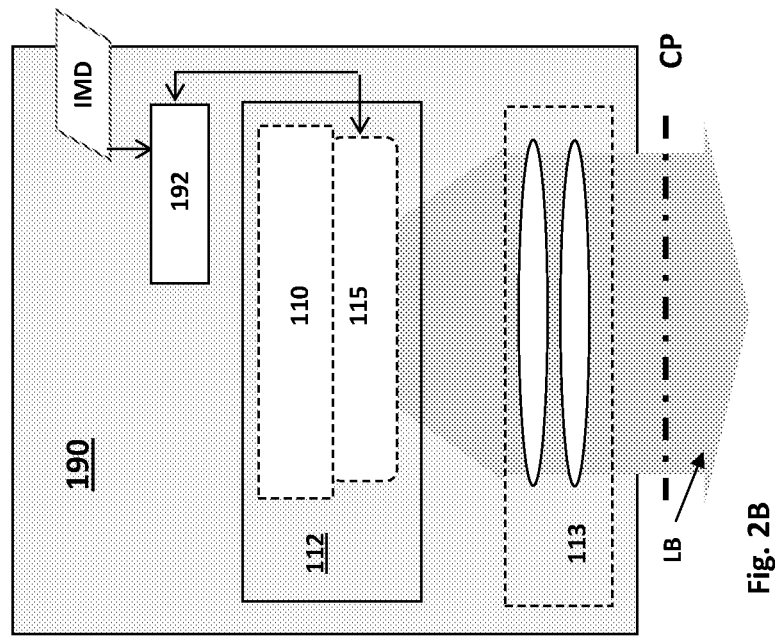
FIGS. 2A and 2B are block diagrams exemplifying the configurations of two image projection systems used in the eye projection device of the invention according to two embodiments of the present invention.
Figure 2A:
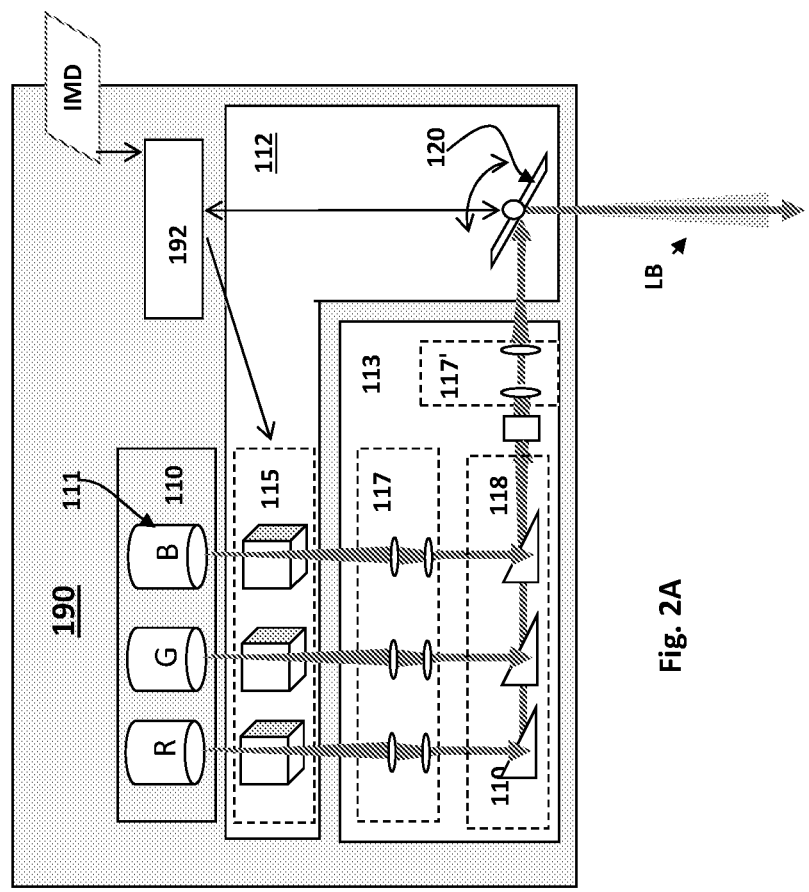

As indicated above, the eye projection system 101 of the invention includes an image projection module 190 that is adapted for outputting a modulated light beam LB that is projected on the retina of the eye for generating/projecting an image thereon. FIGS. 2A and 2B are block diagrams schematically showing the configurations of image projection systems 190 that are included in the eye projection system 101 according to two embodiments of the present invention.

More specifically, FIG. 2A shows an image projection system 190 that projects images on the retina by scanning an intensity modulated light beam LB (including intensity modulated laser beam(s) of one or more colors) on the retina of the eye EYE. The scanned laser beam LB exiting the image projection system 190 propagates via the optical system 150 of the eye projection systems 101, which directs it to the position of the pupil of the eye EYE with the proper orientation so that it projects the image on the correct place on the retina. FIG. 2B shows an image projection system 190, which utilizes an area projection module providing a light beam LB spatially patterned/modulated (structured light) with the desired image to be projected on the retina of the eye EYE. The spatially patterned light beam LB then propagates via the optical assembly 150 and is directed thereby to arrive towards the pupil of the eye EYE with the proper orientation so that the spatially modulated image pattern is projected on the proper location on the retina of the eye EYE. In both cases, the optical assembly 150 may be operated (e.g. controlled by controller 164 which will be discussed in more details below with reference to FIG. 3A) to compensate over changes in the position of the pupil/eye EYE and for changes in the gaze direction, such that the image can be projected on the correct and optionally fixed place on the eye retina regardless of the gaze direction of the eye and/or the relative position between the eye and the image projection systems 190 of the device 100.

It should be noted that in some embodiments it is important that the cross-sectional width of the light beam LB projecting the image on the retina is, or can be controllably adjusted to be, smaller than the nominal diameter of a pupil of a human eye. This provides for projecting the image on the retina with increased depth of field so that the image projected on the retina is maintained focused thereon irrespective of the focal state (focal length state) of the eye lens (namely, irrespectively of the distance to which the user focuses his gaze). This is because the width of the light beam LB actually defines the diameter of the effective entrance pupil through which the light beam enters the eye EYE. Therefore, narrower light beam LB results with narrower effective entrance pupil (narrower than the actual diameter f of the eye's pupil) which yields the image being projected on the retina with an increased depth of field. Providing the narrow beam that is narrower than the pupil is achieved according to various embodiments of the present invention, by using proper light source(s) 110 in the image projection system 190 and/or by using suitable beam expander(s)/contractor(s) optics (not shown) along the optical path OP (e.g. included in the optical system 150 and/or in the optical assembly 113 of the image projection system 190).

FIG. 2A exemplifies an image projection systems 190 which includes a light module 110 adapted for outputting a light beam to be projected on the retina, and an image light modulator 112 arranged along a general optical path of the light beam and adapted to modulate the light beam in accordance with the image to be formed on the retina. In some embodiments the light module 110 includes one or more light channels each including a light emitter, and/or light port 111 providing/emitting light of certain chromatic composition. For projecting grey level images, a single channel (e.g. monochromatic channel) may suffice. In the present example, the image projection system 190 is configured to project colored images, and the light module 110 includes three chromatic light channels (e.g. light ports/emitters, R, G and B, outputting light in different colors: Red, Green, and Blue respectively). In the present example the light ports/emitters 110 are implemented by three R, G and B laser emitters (e.g. laser diodes).

The image projection system 190 also typically includes an optical assembly 113, which is also referred to herein as beam shaping and combining optical assembly. The beam shaping and combining optical assembly 113 is configured and operable for collimating the light beams of the one or more optical channels of the respective one or more colors and combining them so that they propagate along a common general optical path OP. The beam shaping and combining optical assembly 113 may include for example one or more beam shapers (e.g. beam collimators 117 and/or 117') adapted for separately and/or collectively collimate the light of the plurality of optical channels. In case there is more than one optical channel, the beam shaping and combining optical assembly 113 may also include one or more beam combiners 118 which combine the beams of the optical channels to a single optical path OP.

The image light modulator 112 of the image projection system 190 includes one or more intensity modulators 115, which are configured and operable for adjusting the intensity of light from the respective light channels (ports/emitters) associated therewith The intensity modulators 115 may be implemented utilizing respective light source controllers that are connectable to the light emitters/ports of the light module 110 associated therewith and adapted for adjusting their operation so as to control the intensity of light emitted thereby. Alternatively or additionally, the intensity modulators 115 may include and/or implemented with controllable light attenuator (e.g. electro-optical attenuators and mechanical) located in the optical path of the light emitted from the respective light emitters/ports of the light module 110. Alternatively, it can be done by varying the phase matching properties on a non linear crystal(s).

In this example, the image light modulator 112 also includes an image scanning deflector 120, e.g. a raster scanning mirror module and/or two dimensionally angularly adjustable/rotatable deflector (e.g. capable of performing image scan). The image light modulator 112 which generally includes at least one light intensity modulator 115, is configured and operable for modulating the intensity and possibly also the chromatic composition of the light beam LB propagating to the image scanning deflector 120. The image scanning deflector 120 is operated to change its deflection angle as a function of time so that at different times it deflects the light beam LB to different orientations corresponding to the location of different pixels of the image which is to be projected on the retina.

The image projection system 190 typically also includes an image projection controller 192 which receives input data IMD indicative of the image that should be projected on the retina and operates the image light modulator 112 to modulate the light beam LB based on the image data. More specifically, in the present example, the image projection controller 192 obtains data indicative of the angular deflection state of the image scanning deflector 120 (e.g. the angular deflection state may be for example a function of time in case the scanning deflector 120 continuously operates/rotates) and/or the image projection controller may set the deflection state (e.g. by issuing proper control signals to the image scanning deflector 120). Based on the deflection state (e.g. the deflection angle/orientation of the image scanning deflector 120), the image projection controller 192 determines which pixel of the image should currently be projected on the retina, and utilizes the image data IMD to determine the intensity and possibly the chromatic composition of that pixel, and accordingly operates the light intensity modulators 115 (e.g. by issuing proper control signals thereto) to set the proper intensity and chromatic composition of the light beam LB. Accordingly, the image projection controller 192 operates the modules of the image projection system 190 to modulate the light beam LB with the image such that it can be further directed by the optical system 150 of system 100 to the retina, such that the image is projected thereon. In this example, at each time the intensity and possibly the chromatic composition of light beam LB correspond to a single pixel of the image that is projected on the retina. The image scanning deflector 120 scans the light beam LB over the region/surface of the retina, at which different pixels of the image should be projected, while the light intensity modulators 115 operates in conjugation to respectively modulate the light beam LB with the intensities and possibly the chromatic compositions of those pixels thereby forming the image on the retina.

Another example of an image projection system 190 usable in the eye projection system of the invention is illustrated in FIG. 2B. Here, the image light modulator includes an area projection module 115, which may include for example a beam source 110 (e.g. electron beam and/or light source) and spatial light modulator 115. For instance, the area projection module 115 is implemented utilizing any one or more of the following: Cathode-Ray-Tube (CRT; including electron beam source 110 and phosphor layer serving as the spatial light modulator 115), Liquid-Crystal-Display (LCD; e.g. including a light source 110 and liquid crystal spatial light modulator 115 such as Liquid-Crystal-on-Silicon (LCoS)), Digital-Light-Processing module (DLP; e.g. including a light source 110 and Digital-Micromirror-Device (DMD) serving as the spatial light modulator 115), and/or organic light-emitting diode (OLED; which includes a spatial array of light emitting diodes which serves as both the light source 110 and the spatial modulator 115); and/or Resonant Fiber Projector systems.

The area projection module 115 is thus configured and operable for producing/outputting spatially modulated/patterned light beam LB (structured light) which is patterned/modulated with a desired image. The image projection system 190 typically also includes an image projection controller 192, which receives input data IMD indicative of the image that should be projected on the retina, and operates the area projection module 115 to produce the light beam LB such that it is spatially patterned/modulated with that image. In this example, the image projection system 190 may also include an optical assembly 113 including for example beam shaping optics and/or optical relay which can shape and relay the spatially patterned light beam to propagate towards the optical system 150 of the eye projection system 101, by which it is directed to the position of the pupil of the eye EYE with the proper orientation such that the image is projected on the correct place on the retina (e.g. regardless of the gaze direction of the user and also regardless of the relative position between the eye projection system and the eye EYE).

In this regards, it is noted that the image projection controller 192 operates the spatial light modulator 112 of the area projection module 115 for spatially modulating intensity and chromatic composition of the light beam LB, such that the image to be projected on the retina is formed in a cross-section of the light beam LB in a certain conjugate optical plane CP. The optical system 150 of the eye projection system 101 is configured and operable to relay the image formed in the conjugate optical plane CP to the eye retina.

Figure 3A:
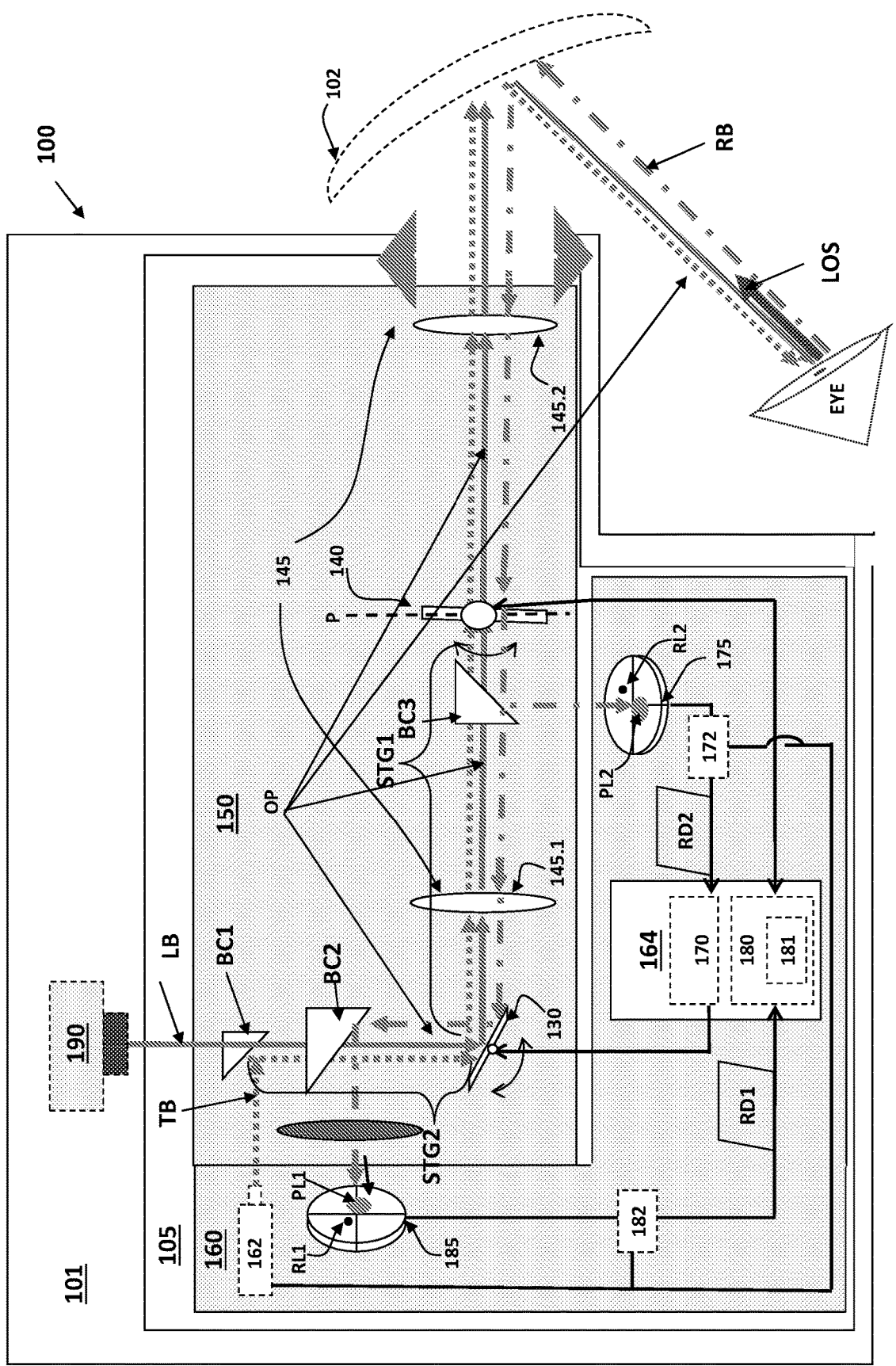
FIG. 3A is a block diagram showing: an eye tracking device that is adapted for monitoring the location and the gaze direction of an eye/pupil, and eye projection device facilitated with the eye tracking device according to an embodiment of the present invention.

Reference is now made to FIG. 3A which is a block diagram showing eye tracking device 105 including an eye tracking module/160 according to an embodiment of the present invention. The eye tracking module/system 160 includes an IR light port configured for providing an IR tracking beam TB, at least two optical sensors 175 and 185, and an eye tracking controller 164. The eye tracking module/system 160 is also associated with or includes an optical assembly which may be similar to that of described above with reference to any one of FIGS. 1A to 1F and is generally configured for directing the IR light beam TB to propagate along a propagation path OP towards an eye EYE of a user. To this end, the optical assembly 150 includes at least two adjustable optical deflectors 130 and 140, configured and operable for adjusting an angular orientation and lateral position of the propagation path PP of the tracking light beam TB as well as other light beams which may propagate along the optical path OP of the optical assembly (e.g. LB), towards the eye. The two optical sensors, 175 and 185, are optically coupled to a general optical path OP of the optical assembly in respective association with the at least two adjustable optical deflectors, such that they respectively sense the reflected IR light beam RB, which is being reflected back from the eye in response to incidence of the tracking IR light beam TB on the eye. The eye tracking module/system 160 may further include an eye tracking controller 164 connectable to the at least two optical sensors 175 and 185. The eye tracking controller 164 is adapted to receive readout information/data from the two optical sensors 175 and 185 and process the readout information to determine data indicative of lateral and angular deviation of the propagation path PP from respectively the pupil position and gaze direction of the eye respectively. To this end, the eye tracking module 160 is adapted to monitor the position/orientation of the eye EYE (i.e. measuring eye positioning data indicative of a gaze direction and a lateral position of the eye EYE) and can be used in conjunction with the eye projection system 101 described above for adjusting the propagation path PP of the eye projection system 101 towards the eye.

The IR light port/source 162 is configured and operable for providing the tracking light beam TB so that it is directed to propagate along the general optical path OP of the optical assembly, while interacting with the one or more adjustable optical deflectors 130 and/or 140, and therefrom propagates along the propagation path PP to the eye. The incidence of tracking beam TB on the eye gives rise to a reflected light beam RB associated with a reflection of the tracing beam TB from the eye for back propagation through the optical path OP of the optical assembly.

The one or more sensors, 175 and 185, are optically coupled to the general optical path OP at two or more different locations along the optical path OP. The sensors 175 and 185 are adapted for receiving the reflected light beam RB and measuring one or more properties of propagation of the reflected light beam RB at the two or more different locations.

The eye tracking controller 164 is connectable to the one or more sensors, 175 and 185, and to the one or more adjustable optical deflectors 130 and/or 140. The controller 164 is adapted to receive from the sensors 175 and 185, readout data/information indicative of the at least one property of propagation of the reflected beam RB at the two or more different locations of the optical path, and process the readout data to determine the eye positioning data, namely, determining data indicative of the lateral (X and/or Y) pupil position of the eye EYE and angular gaze direction of the eye relative to the propagation path PP or optical assembly 150.

In some embodiments the eye positioning data is indicative of a deviation between the gaze direction (LOS) of the eye and the orientation of the propagation path PP of the light beam towards the eye, and a deviation between the lateral (X, Y) position of the pupil of the eye and the propagation path PP.

In some embodiments the eye tracking module 160 includes one or more controllers, e.g. 170 and 180, adapted for utilizing the eye positioning data for generating operative instructions to operate the one or more adjustable optical deflectors 130 and 140 to adjust the angular orientation (pitch and yaw) and lateral position (X, Y) of the propagation path PP to compensate over lateral and angular orientations thereof relative to the eye.

According to some embodiments of the present invention the adjustable optical deflectors 130 and/or 140 are arranged successively along the optical path OP to thereby respectively define two deflection stages STG1 and STG2 of the optical path OP associated with deflection of the optical path OP by the two adjustable optical deflectors 130 and/or 140 respectively. Accordingly, the two or more different locations at which the sensors 175 and 185 are optically coupled to the optical path OP are arranged at those two deflection stages STG1 and STG2 respectively. The sensors 175 and 185 may be coupled to the optical path via respective beam splitter combiners BC3 and BC2 arranged at those stages STG1 and STG2 of the optical path.

The eye tracking controller 164 is configured and operable for generating operative instructions for each respective adjustable optical deflector 140 and/or 130 based on the corresponding property of propagation measured by the corresponding sensor 175 or 185 from the respective deflection stage STG1 or STG2 of the optical path OP which is associated with the respective one 140 or 130 of the adjustable optical deflectors.

For instance, the property of propagation of the reflected light beam RB may be the lateral off axis deviation of the propagation of the reflected light beam RB from a predetermined nominal lateral position in the optical path OP. To this end, each of the sensors 175 and 185 may include a plurality of light sensitive detectors/pixels. The controller 164 may be adapted to process the readout data/information from the pixels of the sensor 175 or 185 to determine a location of incidence of the reflected light beam RB on the sensor and thereby determine a deviation between this location of incidence and a predetermined nominal position on the sensor. Accordingly, property of propagation of the reflected light beam RB along the respective stage STG1 or STG2 of the optical path OP is determined. From this property of propagation (e.g. being the lateral off axis deviation of the propagation of the reflected light beam RB from a predetermined nominal lateral position in the optical path OP) determined for two or more stages STG1 and STG2 of the optical path OP, the data indicative of the lateral and angular position of the eye can be calculated/estimated/determined. Accordingly the adjustable optical deflectors 140 and/or 130 can be operated/adjusted to track the lateral position/orientation of the eye EYE.

For instance, according to some embodiments of the present invention, the eye tracking controller 164 includes one or more servo loops (e.g. servo-loop controllers 170 and/or 180), whereby each servo loop controller is configured and operable to connect to a respective adjustable optical deflector (e.g. 130 and/or 140 respectively) and to a corresponding sensor (e.g. 175 and/or 185 respectively) and is adapted to process the readout data from the respective sensor (e.g. 175 and/or 185 respectively) to determine the corresponding propagation property in its respective stage of the optical path OP (e.g. STG1 and/or STG2) and accordingly based on that propagation property, generate operative instructions for operating the respective adjustable optical deflector (e.g. 130 and/or 140) associated therewith.

To this end, in the non limiting example for FIG. 3A, the eye tracking module/system 160 is illustrated as being configured and operable in conjunction with an eye projection device 100 of the present invention. More specifically, in this non limiting example, the eye projection device 100 includes at least one eye projection system 101, which includes, or is incorporated with, the eye tracking device 105 which is configured and operable as described above for monitoring and possibly tracking the location of the eye/pupil and the line of sight direction (i.e. gaze direction) of the eye EYE. The eye projection system 101 may be configured similarly to the eye projection system shown in any one of FIGS. 1A to 1F, and may optionally include an image projection module 190 for projecting light/images LB to the eye EYE via the optical system 150. The eye tracking device 105 is adapted to monitor the lateral position and line of sight (LOS) of the eye EYE and operate the optical system/assembly 150 to track/follow the position and line of sight of the eye EYE such that propagation path PP of the light beam LB (image projection light beam) is directed to the position of the eye (e.g. to the eye pupil) with the desired orientation with respect to the line of sight LOS of the eye EYE. To this end, in this particular example, the image/light projecting light beam LB as well as the tracking light beam TB (typically IR light) and the reflected light beam RB are coupled to propagate along the common optical path of the optical assembly 150 and the common propagation path PP to the eye EYE. In some embodiments the eye projection device 100 includes two eye projection systems similar to eye projection system 101, which are configured and operable for respectively projecting images to both of the user's eyes.

It should be however understood that the eye tracking device 105 and/or the eye monitoring module 160 may be implemented as standalone device/module connectable to the eye projection system 101, and/or it may be modules/devices integrated with the eye projection system 101. In this example the optical system 150 is used by the eye projection system 101 for projecting images to the eye EYE and is also used by the eye tracking device 105 for monitoring and tracking the location and line of sight of the eye EYE. Also, alternatively or additionally, the eye monitoring module 160 may be implemented as stand alone device configured such that it can be optically coupled to the optical system 150 and electrically connected to the beam deflectors 130 and 140 thereof and operable for sensing returned light beams RB propagating from the exit pupil EP along the optical path OP, processing the sensed light signals to track the lateral position and line of sight of the eye, and operating the adjustable beam deflectors 130 and 140 to adjust the propagation path PP of light beam (e.g. TB and/or LB) between the optical assembly 150 and the eye EYE such that the light beam LB is directed to the location of the eye/pupil thereof with the desired orientation.

In this example the eye projection system 101 includes similar modules as those of the eye projection systems illustrated in any one of FIGS. 1A to 1F. More specifically, it optionally includes an image projection system 190, which can be configured and operable as any one of the image projection systems described in FIGS. 2A and 2B; and an optical system/assembly 150 configured and operable for directing the light beam LB from the image projection system 190 to the eye EYE (e.g. via a spectacles lens 102). Similarly to the optical system 150 described above with reference to FIGS. 1A to 1B, also here the optical system 150 includes at least one and typically at least two, adjustable optical deflectors (e.g. gaze direction beam deflector 130 and pupil position beam deflector 140 as in FIG. 1A) arranged along the general optical path OP of the light beam LB and configured and operable for providing at least three and typically four degrees of freedom in adjusting propagation path OP of the light beam LB towards the eye EYE. Two of the degrees of freedom are associated with compensating for angular changes in the gaze direction of the eye EYE, and at least one degree of freedom, typically/preferably two degrees of freedom, provide for compensating over variations in the relative lateral, vertical and/or horizontal, position of the eye projection device 100 relative to the eye EYE.

It should be understood that the angular movements of the LOS of the eye are particularly related to saccade movements of the eye, and that the lateral movement of the eye are particularly related to the relative lateral movement between the lateral position of the pupil and the eye projection/tracking systems.

It should be noted that in some embodiments the eye monitoring module 160 includes the tracking light source 162 emitting an eye tracking light beam TB. Alternatively or additionally, in some embodiments the tracking light source may not be a part of the eye monitoring module 160 and the eye monitoring module 160 only includes a light port 162 for receiving the tracking light beam TB. In various embodiments of the present invention the tracking light source may be optically connectable/coupleable to the optical system/ assembly 150 via the light port 162 such that the tracking light beam TB is directed to the eye via the optical system 150; and/or tracking light source 162 may not be coupled to the optical system 150 and the tracking light beam TB is directed to the eye EYE in a different way (e.g. by free space propagation, or via another optical guide/system).

In this specific and non-limiting embodiment of the present invention illustrated in FIG. 3A, the tracking light source 162 is arranged and configured to be in optical communication with the optical system 150 such that the tracking light beam TB can propagate along the general optical path OP of the optical system 150 and propagate along the optical path PP towards the retina of the eye EYE. To this end, the tracking light source 162 is associated with a beam combiner BC1 (e.g. dichroic beam combiner) located in the optical path OP of the optical system 150 and in the propagation path of the tracking light beam TB outputted from the tracking light source 162 such that the tracking light beam TB is directed to propagate together with the image projecting light beam LB towards the eye EYE along the optical path OP. The tracking light source 162 is generally a source of light/electromagnetic-radiation 162 of wavelength/spectra so that user discomfort associated with the existence of fixed visible light source within the field of view of the eye is avoided or at least significantly reduced. For example, the tracking light source 162 may be an Infra-Red (IR) light source (e.g. IR laser diode) emitting IR beam invisible to the human eye.

It is noted that according to certain embodiments of the present invention the eye tracking light beam TB is combined to propagate along the optical path OP while interacting successively with both of the adjustable optical deflectors 130 and 140 of the optical assembly 150 on its way to the eye EYE, such that it can be directed towards the eye while the eye may be looking in various gaze directions and while its relative lateral position with respect to the eye projection system 101 may vary. To this end, the beam combiner BC1 may be located to intersect the optical path OP at a location upstream from the adjustable beam deflectors 130 and 140.

Therefore, when the adjustable optical deflectors 130 and 140 are properly adjusted (namely when their deflection parameters are properly set to direct the light beam to the eye with the proper lateral position and angular orientation of the propagation path PP towards the eye), the eye tracking light beam TB is directed to propagate along the propagation path towards the pupil of the eye EYE from which it possibly enters the eye and possibly is being projected on the retina.

In some embodiments the cross-sectional width of the eye tracking light beam TB is smaller than the nominal diameter of a pupil of a human eye. In that case reflections of the eye tracking light beam TB from the area of the eye surrounding the pupil are minimized, which in turn reduces the interferences of the tracking beam TB with such reflections and accuracy of the tracking is improved. In some embodiments, in order to coop with scenarios in which the eye gaze is shifted to an extent that the tracking beam TB is shifted entirely out of the pupil (the signal is lost), the adjustable optical deflectors (e.g. adjustable mirrors) in the optical system (e.g. 130 and/or 140) may include and/or configured to provide certain pattern such as the so called Lassajous pattern (which enable to expand the search area in order to regain the lost signal). The Lassajous patterns for pupil search algorithm are performed in the lateral domain first, until the initial signal is acquired, and then in the angular domain for optimal alignment of the optical path. The pattern (e.g. Lassajous pattern) may then be used to locate the reflection of the tracking beam TB from the periphery of the pupil and correct deflection parameters of the adjustable optical deflectors 130 and/or 140 to align the propagation path PP with the lateral position of the pupil and the pitch/yaw orientations of the LOS of the eye. Alternatively or additionally, the sensors 175 and/or 185 may be used for sensing the reflected light beam RB from the eye to track the location and gaze direction of the eye, and may be configured as a large area quad cells (e.g. multi diode arrays), in order to minimize the chances of occurrence of such scenarios.

Generally, when the eye tracking light beam TB impinge on the eye EYE, a portion RB of the eye tracking light beam TB may be reflected back from the eye EYE retina (so called retinal reflection) and returned along the optical path OP. Alternatively or additionally, a portion RB of the eye tracking light beam TB may be reflected from the cornea of the eye EYE (so called corneal reflection and/or one of the Purkinje images). In some embodiments, the light beam RB may include portions of the eye tracking light beam TB that are reflected from the front of the cornea (first Purkinje image), from the back of the lens (so called fourth Purkinje image), and/or from the retina (retinal reflection). In general, the reflected light beam then propagates back from the eye EYE to the optical path OP of the optical system 150 where the exact direction of propagation of the reflected light beam RB is indicative of the position and/or orientation of the pupil of the eye EYE.

Certain embodiments of the present invention advantageously utilize the retro reflective properties of the eye, in particular utilizing the fact that the eye retina is retro-reflective. At IR wavelength the retina is able to reflect significant percentage of light. This is used by the gaze direction tracking system of certain embodiments of the present invention to track the actual optical axis of the eye, or any other arbitrary optical direction situated at an angle to the optical axis of the eye. Tracking the actual optical axis of the eye or any such other arbitrary optical direction is achieved by the utilizing the eye as a retro-reflector (exploiting the eye's retro-reflective properties) and not necessarily relying on the Purkinje images as done in conventional approaches. Using the retro reflective properties of the eye provides that the reflected beam returns with certain predetermine angle relative to the optical axis of the eye, thus allowing the system to track the actual optical axis of the eye. Although the retro reflector properties of the eye may have some level of chromatic aberration, nevertheless it is still possible to exploit the retro reflective properties of the eye to detect eye's angular and lateral shifts with high accuracy.

According to some embodiments of the present invention, the two light sensors 175 and 185 of the eye monitoring module 160 are arranged and optically coupled to an optical path (e.g. the optical path OP of the optical assembly 150) along which the reflected light beam RB propagates such that the location of incidence of the reflected beam RB on at least a first one of the light sensors provides data indicative of the lateral deviation (X and/or Y deviation) between the position of the pupil of the eye EYE and the lateral position of the propagation path PP of the light beam LB, and such that the location of incidence of the reflect beam RB on at least a second one of the light sensors provides data indicative of the angular deviation (pitch and/or yaw deviations) between the propagation path PP and the line of sight of the eye EYE. Indeed, in general, the light sensors may include two dimensional optical sensors 175 and 185 arranged along the optical path of the returned light so as to monitor 4 degrees of freedom of the propagation path PP. For instance, a first one of the sensors (e.g. 175 in the figure) may be arranged along the optical path of the reflected light beam in a location/stage STG1 of the optical path OP between the optical elements of an optical relay (e.g. being the optical relay 145 or a similar one), for instance near a principal plane of the relay 145, such that angular deviations of the reflected beam RB from a certain nominal optical axis having predetermined relation/correspondence with the propagation path PP of light beam LB, are converted to a lateral deviation in the location at which the beam RB impinges on the optical sensor 175. This allows measuring/determining the deviation in the pitch and yaw angular orientation of the propagation path PP relative to the line of sight of the eye. A second one of the sensors (e.g. 185 in the figure) may be optically coupled to the optical path of the reflected light beam RB at location/stage STG2 of the optical path OP at which it propagates not within an optical relay (e.g. outside the relay 145 if such relay is used) to thereby directly measure the lateral deviation of the reflected beam RB from the certain nominal optical axis having the predetermined relation/correspondence with the propagation path PP. This allows measuring/determining the lateral deviation X and/or Y between the propagation path PP and the position of the eye.

It should be noted that in some embodiments of the present invention the optical sensor measuring the angular deviations of the propagation path PP may not be entirely optically decoupled from the effects of lateral deviations of the propagation path PP, and vice-versa (namely, the optical sensor measuring the lateral deviations of the propagation path PP may not be entirely optically decoupled from the effects of angular deviations of the propagation path PP). In such cases, further processing is applied to the measurements obtained from both sensors 175 and 185 to determine the angular (pitch and yaw) and the lateral (X and Y) deviations of the propagation path PP from those measurements. For instance, the measurements from both sensors may be obtained and first processed to determine the locations of incidence of the reflected light beam RB on each of the sensors. Then, the locations (e.g. represented as vectors) may presented in matrix form, which may then be diagonalized (e.g. using representation data indicative of the optical operation of the optical assembly 150, such as matrix or function representation of the optical assembly 150) to determine the angular orientation and the lateral deviations of the propagation path PP from the lateral location and the gaze direction of the eye.

According to some embodiments the light sensors 175 and 185 are arranged at different stages/locations STG1 and STG2 of the optical path OP, whereby the different stages STG1 and STG2 are selected such that the returned/reflected light beam RB interacts with a different combination of the adjustable optical deflectors 140 and 130 before reaching the different light sensors 175 and 185. The light sensors 175 and 185 may be arranged in this way such that each of them is respectively associated with one of the adjustable optical deflectors 140 and 130, and more specifically such that the location of incidence of the light beam on each of the sensors provides data indicative of the required corrections that should be applied to its respective adjustable optical deflector. This allows applying open/closed servo loop operation for adjusting each of the deflectors based on the readout data obtained from its respective sensor. For instance, as illustrated in the figure, the light sensors 175 is arranged at stage STG1 to sense the returned light beam RB after it interacts with the adjustable deflector 140, and before it interacts with the deflector 130. Accordingly, a deviation of the location of incidence of the returned light beam RB from a predetermined nominal location on the sensor 175 (e.g. from the center of the sensor) is indicative of a required correction for the adjustment of the adjustable deflector 140, and may be processed by a servo loop circuit (e.g. controller 170) as described below to re-adjust the deflector 140. Similarly, the light sensors 185 is arranged to sense the returned light beam RB at stage STG2 after it interacts with a different set of the adjustable deflectors 140 and 130 (in this non limiting example after it interacts with both of the adjustable deflectors 140 and 130), so that provided that the adjustable deflectors 140 are already properly adjusted, a deviation of the location of incidence of the returned light beam RB from a predetermined nominal location on the sensor 185 (e.g. from the center of the sensor) is indicative of a required correction for the adjustment of the adjustable deflector 130, and may be processed by a servo-loop circuit (e.g. controller 180) as described below to re-adjust the deflector 130.

It should be noted that for clarity and without loss of generality, the non-limiting particular example of FIG. 3A shows the eye tracking device 105 of the present invention configured to operate in conjunction with the eye projection system 101 as exemplified and described above with reference to FIG. 1A. More specifically, in this non-limiting example the tracking light beam TB from the tracking light source 162 is optically coupled via beam combiner BC1 to the optical path OP of the optical assembly 150, which is similar to that shown in FIG. 1A. The reflected beam RB returns along that optical path OP and is directed from the optical path OP to the sensors 175 and 185 by respective beam splitters/combiners, BC3 and BC2, which are arranged to intersect the optical path OP of the optical assembly at specific locations. Accordingly, in this particular example, the optical assembly 150 is configured to implement the decoupling feature of the present invention as discussed above with reference to FIGS. 1A, 1D, 1E and 1F. Namely, according to which the deflection parameters of beam deflector 130 are decoupled from controlling the lateral (X, Y) position of the propagation path PP, and the deflection parameters of beam deflector 140 are decoupled from controlling the angular (pitch, yaw) orientation of the propagation path PP. Thus, the beam deflectors 130 and 140 are, in this particular and non limiting example, configured and operable exclusively as gaze direction beam deflector and pupil position beam deflector, and are therefore for clarity referred to as such in the following. In this example, the light sensor 185 is configured (utilizing the proper arrangement of the beam splitter BC2) to interact-with/sense the reflected light beam RB after it is deflected by the beam deflectors 130, and accordingly in this particular example (where the beam deflector 130 functions exclusively as gaze direction beam deflector) it provides measured data indicative of an angular deviation of the propagation path PP from the line of sight of the eye LOS. Therefore, for clarity, the light sensor 185 is referred to in the following as a gaze direction sensor 185. The light sensor 175 is, in this example, configured (utilizing the proper arrangement of the beam splitter BC3) to interact-with/sense the reflected light beam RB after it is deflected by the beam deflectors 140 and before in interacts with the beam deflector 130. Accordingly, in this particular example (where the beam deflector 140 functions exclusively as pupil position beam deflector) the light sensor 175 provides measured data indicative of the lateral deviation of the propagation path PP from the position of the pupil of the eye EYE. Therefore, for clarity, the light sensor 175 is referred to in the following as a pupil position light sensor 175. It should, however, be understood that although for clarity the light sensors, 185 and 175, and adjustable beam deflectors 130 and 140 are referend to in the followings as pupil-position and gaze-direction sensors/deflectors, in embodiments where other configurations of the optical assembly 150 is used, the distinction between the pupil-position and gaze-direction sensors/deflectors as both deflectors and both light sensors may be sensitive to (affect/measure) the deviation of the propagation path from the pupil-position and gaze-direction. This is for example in embodiments in which the eye tracking device 105 is optically coupled to optical assemblies 150 such as those shown in FIGS. 1B and 1C in which all or several deflection parameters of the deflectors may be coupled to affect several of the degrees of freedom of the propagation path PP (namely there may not exist one to one correspondence between the deflection parameters of the deflectors and the angular and lateral direction of the propagation path). Therefore, it is understood that in general, the operation/configurations of the pupil position sensors/deflectors is not necessary limited to affect/measure the propagation path PP with respect to the pupil position but may also function to affect/measure the propagation path PP with respect to the gaze direction. Also, it is to be understood that in general the operation/configurations of the gaze direction sensors/deflectors is not necessary limited to affect/measure the propagation path PP with respect to the gaze direction but may also function to affect/measure the propagation path PP with respect to the pupil position.

The gaze direction sensor includes a plurality of light detectors (e.g. few/four light detectors/pixels) sensitive to the wavelengths of the reflected light beam RB. For example, the gaze direction sensor 185 may be implemented with a quadrant IR light sensor (e.g. quad sensor including four of light detectors organized in a 2 by 2 configuration) and/or a Position Sensing Device (PSD) and/or a Time Delay Integration Charge Coupled Device (TDI-CCD) and/or Complementary metal-oxide-semiconductor (CMOS) with Region Of Interest (ROI) selection capability. The gaze direction sensor 185 is optically coupled to the optical path OP and arranged such that it collects the reflected light beam RB, after the reflected light beam RB is reflected from the eye EYE and interacts with the gaze direction beam deflector 130. As illustrated in the figure, in the present example the gaze direction sensor 185 is optically coupled to the optical path OP by beam combiner BC2 (e.g. implemented with dichroic mirror), which is a part of the optical system located downstream from the gaze direction beam deflector 130 with respect to the direction of propagation of the reflected light beam RB from the EYE. Accordingly, when the projection location PL1 of the reflected light beam RB on the gaze direction sensor 185 is centered on with respect to the gaze direction sensor (or with respect to a certain reference position RL1 thereon), it indicates that optical path OP (and accordingly the gaze tracking light beam TB and the light beam LB carrying the projecting the image on the retina) had incident the eye EYE with a certain predetermined/known incidence angle with respect to the line of sight LOS of the eye EYE (e.g. when incident the eye, the optical path OP coincides with the line of sight LOS of the eye EYE). Yet, when the projection location PL1 of the reflected light beam RB deviates from the central/reference location RL1 on the gaze direction sensor 185, it indicates that the incidence angle of the optical path OP with the eye EYE had deviated from the predetermined/known incidence angle (e.g. the optical path no longer coincides with the line of sight LOS).

In this regards, as noted above, the exact direction of propagation of the reflected light beam RB is indicative of orientation of the pupil of the eye EYE (i.e. of the gaze direction/line of sight LOS of the eye EYE). However, in the present embodiment the reflected light beam RB interacts with the gaze direction beam deflector 130 before its incidence upon the gaze direction sensor 185, and therefore deviation of the central/reference location RL1 on the gaze direction sensor 185 is actually specifically indicative in the present case of the relative orientation between the optical path OP along which the light beams LB and/or TB are directed to incident the eye EYE and the line of sight LOS of the eye EYE (e.g. indicative of the two angles spanned between the line of sight LOS and the projection of optical path OP on two respectively orthogonal planes parallel to the line of sight LOS).

In the present embodiment the eye tracking controller 164 includes a first sub-controller 180 (e.g. herein after also referred to as gaze direction controller 180) connectable to the gaze direction sensor 185. The gaze direction controller 180 is adapted to obtain/receive readout information/data RD1 from the plurality of detectors of the gaze direction sensor 185. The eye tracking controller 164 and/or the first sub-controller 180 may include a digital processor and/or an analogue processing circuit and may be configured and operable (e.g. via suitable software core and/or hardware configuration) to process the readout information RD1 to determine the angular deviation of the gaze direction (line of sight LOS) of the eye EYE from the optical propagation path OP along which the light beams LB and/or TB are directed towards the eye EYE.

For instance, the gaze direction controller 180 may be adapted to receive the readout information/data RD1 indicative of the values accumulated by the individual detectors/pixels of the gaze direction sensor 185, and process this data to determine a nominal projection location/pixel PL1 on the sensor 185 presenting the center of the reflected light beam RB that incident on the gaze direction sensor 185. Then, the gaze direction controller 180 may determine vector data presenting the separation between nominal location/pixel and the reference location RL1 on the sensor 185, which presents perfect alignment of the optical path OP with the light of sight LOS. The vector data is thus indicative of the angular deviation between the orientation of the optical path OP that incident on the eye EYE and the line of sight LOS of the eye EYE.

In some embodiments, for example specifically in cases where the eye monitoring module/device 160 is part of an eye projection system 100, the gaze direction controller 180 may also be connectable to the gaze direction beam deflector 130. In such embodiments, the gaze direction controller 180 may be configured and operable for further processing the vector data to determine the required angular position for the gaze direction beam deflector 130 needed to compensate the angular deviation between the optical path OP and the line of sight LOS, and generate suitable operative instructions/or control signals for operating the gaze direction beam deflector 130 accordingly.

For instance, in certain embodiments of the present invention the gaze direction sensor 185 is implemented by a quad (quadrant) sensor including four IR light detectors (four light sensitive pixels). The gaze direction controller 180 is connectable to the quad sensor 185 and is configured and operable for operating gaze direction beam deflector 130 to minimize deviation of the reflected light beam RB from a center location (RL1) of the quad sensor 185. This maintains the optical path OP with substantially fixed orientation relative of the line of sight LOS such that the image projected by the light beam LB on the retina is maintained at substantially fixed location on the retina even if the user shifts his gaze.

In some variants, the gaze direction controller 180 is adapted to operate the gaze direction beam deflector 130 for minimizing the deviation of the reflected light beam RB from a center/reference location RL1, only in cases the deviation exceeds a certain predetermined threshold (tremor threshold) such that the deviation is maintained in levels below the predetermined threshold (e.g. but is not necessarily nullified). For example, the gaze direction controller 180 may include a tremor filtration module 181 that is adapted to process the readout data RD1 (e.g. process the vector data indicated above) and filter out cases where the angular deviations of the gaze direction are associated with tremor movement of the eye. It should be understood that the terms tremor and tremor-movement are used herein to designate micro-saccade movements, which are angular saccade movements in the order of micro-degrees and up to almost a degree.

In some embodiments the tremor filtration module 181 utilizes a predetermined tremor deviation threshold associated therewith (e.g. stored thereby). The tremor filtration module 181 is configured and operable to process the readout data RD1 (e.g. the vector data) to continuously monitor the angular deviations between the gaze direction LOS of the eye and the optical path OP and operate as follows: In case the monitored angular deviation is lower than the tremor deviation threshold, the tremor filtration module 181 operates in a so called open servo loop, which does not operate gaze direction beam deflector 130 and thereby does not compensate for deviations associated with tremor movements. In case the monitored angular deviation exceeds the tremor deviation threshold, the tremor filtration module 181 operates in a so called closed servo loop, in which proper operative instructions/signals are communicated to the actuator/servo of the direction beam deflector 130 for actuating it to minimize the deviation of the reflected light beam RB from a center/reference location RL1 on the sensor 185.

The tremor filtration module 181 thereby compensates over changes in the gaze, which are not associated with the natural (automatic) tremor motion of the eye, while not compensating over gaze deviations associated with the natural tremor movement of the eye EYE. This improves the quality of the perception of the image projected on the retina as the image location on the retina does shift as consequence of the natural tremor motion of the eye thus a natural image captured by the eye EYE.

In some embodiments, the eye monitoring module 160 also includes a light sensor 175, being a pupil position sensor 175. The pupil position sensor 175 includes a plurality of light detectors sensitive to the wavelengths of the tracking/reflected light beam TB and/or RB. For instance the light sensor 175 may include a quadrant IR light sensor including few/four light detectors/pixels organized in a 2 by 2 configuration and/or a Position Sensing Device (PSD) and/or a Time Delay Integration Charge Coupled Device (TDI-CCD) and/or Complementary metal-oxide-semiconductor (CMOS) with Region Of Interest (ROI) selection capability.

The pupil position sensor 175 may be for example optically coupled to the optical path OP at stage STG1 thereof and arranged such that it collects the reflected light beam RB, after it is reflected from the eye EYE back to the optical path OP and interacts with the pupil position direction beam deflector 130. As illustrated in the figure, in the present example the gaze direction sensor 185 is optically coupled to the optical path OP by beam combiner BC3 (e.g. implemented with dichroic mirror), which is located at stage STG2 along the optical path OP downstream from the pupil position beam deflector 130 with respect to the direction of propagation of the reflected light beam RB from the EYE. Accordingly when the projection PL2 of the reflected light beam RB in the pupil position sensor 175 is centered with respect to the pupil position sensor 175 (or with respect to a certain reference position RL2 thereon), it indicates that optical path OP arrives with proper lateral alignment towards the eye EYE (and accordingly the tracking light beam TB and/or the image projection light beam LB are directed to the position of the eye). In case the projection location PL2 of the reflected light beam RB deviates from the central/reference location RL2, it indicates that the optical path OP does not coincide with the position of the eye/pupil EYE and should be laterally shifted to meet the eye.

In some embodiments the eye monitoring module 160 and/or the eye tracking controller 164 include a second sub controller 170 (e.g. being referred to in the following for clarity also as pupil position controller 170) connectable to the pupil position sensor 175 and to the pupil position beam deflector 140. The pupil position controller 170 is adapted to obtain/receive readout information/data RD2 from the plurality of detectors of the pupil position sensor 175. The eye tracking controller 164 and/or the second sub-controller 170 may include a digital processor and/or an analogue processing circuit and may be configured and operable (e.g. via suitable software core and/or hardware configuration) to process the readout information RD2 to determine the lateral deviation (e.g. the vertical and/or horizontal distances) between the optical propagation path OP along which the light beams LB and/or TB are directed towards the eye EYE, and the center of the eye/pupil EYE.

For example, the pupil position controller 170 may be adapted to receive the readout information (data/signals) RD2 which is indicative of the values accumulated by the individual detectors/pixels of the pupil position sensor 175, and process this data to determine a nominal projection location/pixel PL2 on the sensor 175 presenting the center of the projection location PL2 of the incident reflected light beam RB on the pupil position sensor 185. Then the gaze direction controller 180 may determine second vector data presenting the separation between projection location/pixel PL1 and the reference location RL1 on the sensor 185, which presents the perfect lateral alignment of the optical path OP with the eye EYE.

In some embodiments, the pupil position controller 170 may also be connectable to the pupil position beam deflector 140. The pupil position controller 180 may be configured and operable to process the second vector data to determine if there is a need to compensate for lateral deviation between the optical path OP and the position of the center of the eye/pupil EYE, and if so, generate suitable operative instructions/or control signals to operate the pupil position beam deflector 175 to compensate for such lateral deviation.

FIG. 3B is a flow chart of a method 300 of monitoring the location and line of sight (gaze) of an eye or other optical system. In some embodiments of the present invention the eye tracking device 105 and/or the eye monitoring module 160, which are shown in FIG. 3A, are configured and operable for implementing the operations of method 300 described below.

Method 300 optionally includes steps 310 and 320 (e.g. similar to steps 210 and 220 described above) providing first and second beam deflectors (e.g. the gaze direction 130 and pupil position 140 beam deflectors shown in FIGS. 3A and 1B) arranged in the optical path of the optical system (e.g. 150). The deflection states/angles of the first and second beam deflector (e.g. 130 and 140) are respectively associated with the adjustment of the orientation and lateral position of the tracking light beam TB that is output from the exit pupil/port EP.

Method 300 also optionally includes steps 330 and 340. In 330 and 340 provided are first and second light sensors, respectively, arranged for sensing reflected light RB that comes through the exit pupil/port and propagates along the optical path OP. Each of the first and second light sensors includes a plurality of light detectors. The first light sensor (e.g. gaze direction sensor 185 in FIG. 3A) is located along the optical path OP of the optical system and arranged such that it can sense the reflected light RB coming from the exit pupil after the reflected light beam RB interacts with the first beam deflector (e.g. with 130). The second light sensor (e.g. pupil position sensor 1785 in FIG. 3A) is located along the optical path OP of the optical system and arranged such that it can sense the reflected light RB coming from the exit pupil after the reflected light beam RB interacts with the second beam deflector (e.g. with 140). Accordingly, as also indicated above, the delta/shift between the nominal projection location PL1 of the reflected light RB on the first light sensor 185 from a certain reference location RL1 on the first sensor is indicative of the required compensation in the orientation of the beam tracking beam TB (e.g. indicates the required modification or at least the direction to which the deflection state of the first deflector should be modified in order to reduce the deviation of the orientation of the tracking beam from the orientation of the line of sight LOS). In the same way, the delta/shift between the nominal projection location PL2 of the reflected light RB on the second light sensor 185 from a certain reference location RL2 on the second sensor is indicative of the required compensation in the lateral position at which the tracking beam TB exits the exit pupil EP (e.g. it indicates the required modification, or at least the direction to which the deflection state of the second deflector should be modified in order to reduce the deviation of the lateral position of the tracking beam from the lateral position of the line of sight LOS).

Optional operation 350 includes directing a tracking light beam TB through the optical system (e.g. 150). As indicated above the tracking light beam may be infra-red light.

In operation 360, readout data RD1 is obtained from the first sensor 185. The readout data/signals RD1 is indicative of a projection location PL1 of the beam RB on the first sensor 185. Operation 370 includes operating at least the first beam deflector to compensate over variations in a gaze direction/line of sight (LOS) of the eye (e.g. to compensate/reduce variations that are not associated with tremor motion of the eye). For example the controller 164 may include a module/circuit (pupil position controller) 180, which according to certain embodiments of the present invention operates at least the first beam deflector in accordance with method 307 exemplified in a flow chart in FIG. 3C.

As shown in FIG. 3C, method 307 includes at least the gaze direction servo-loop operation 440 which adjusts the gaze direction beam deflector 130 to compensate over variations in a gaze direction of the eye. The servo-loop operation 440 includes two main sub operations:

442—the readout data/signals from the pixels of the first sensor (gaze direction sensor) 185 are processed to estimate the relative nominal projection location PL1 of the returned light beam RB on the first sensor 185; and

444—the deflection angle/state gaze direction beam deflector is adjusted in accordance with the nominal projection location PL1 so as to reduce the angular deviation between the optical path/axis OP of propagation of the reflected light beam RB reflected from the eye and the line of sight LOS of the eye EYE.

Operations 442 and 444 are repeated in a loop with high frequency (e.g. in the order of less than $10^{-3}$ sec and possibly in higher frequency in the order of $10^{-4}$ sec), or at least in frequency higher than the "sensing/perception frequency" (perception time) of a human eye, so that when the user changes his gaze he will not notice any flickering (e.g. he will not notice any dislocation, smear and/or clipping) in the image projected to his eye. To this end, operations 442 and 444 may be implemented by analogue circuits and/or digital processing units. For instance, the gaze direction sensor may include quadrant detector comprising four circularly arranged pixels Q1-Q4. Controller circuit/processing-unit 180 may include two differentiators: a first one differentiating between the sum of voltage signals from pixels Q1+Q2 minus the sum of signals from pixels Q3+Q4; and the second one differentiating between the sum of voltage signals from pixels Q2+Q3 minus the sum of signals from pixels Q4+Q1. The output signal/data of the first differentiator is indicative of a deviation of the projection location PL1 of the returned beam RB from the central location on the sensor 185 (being in this example the reference location RL1). The output signal/data of the first differentiator may be connected/provided to a servo actuator controlling the upwards-downwards angular position/state of the gaze direction beam deflector 130, thus adjusting the up-down orientation of the tracking beam TB in accordance with the gaze direction LOS. Similarly, the output signal/data of the second differentiator may be connected/provided to a servo actuator controlling the left-right angular position/state of the gaze direction beam deflector 130, thus adjusting the left-right orientation of the tracking beam TB in accordance with the gaze direction LOS. This processing which may involve only few computations of data/signal can be carried out very fast to be enough to provide response time which is unnoticeable to the user. The scale of the movement is also defined by the total sum of all the energy on the sensor: q1+q2+q3+q4, therefore it's resolution is proportional to the amount of energy reaching the sensor.

As indicated above, the operation 370 may be adapted such that only variations in the gaze direction/line of sight (LOS) of the eye, which are not associated with tremor motion of the eye, are compensated/reduced. To this end, the method 307 may also include optional operations 410 to 434 which actually implement a tremor filtration. In operations 410 and 420 readout data/signals RD1 from a light sensor 185 are obtained and processed to determine/estimate vector data indicative of magnitude and direction of the deviation of the projection location PL1 of the returned light beam RB from the reference location RL1 on the sensor 185. A person of ordinary skill in the art will readily appreciate that there are various known suitable techniques for estimating this vector data, given the number and arrangement of light detectors/pixels on the sensor 185. Then, operation 430 is carried out to determine/estimate whether the deviation of the projection location PL1 of the returned light beam RB from the reference location RL1 is a small deviation associated with tremor movement of the eye EYE, or is large enough deviation to be treated as change in the gaze direction. In case the deviation is small (it is only tremor movement), operation 434 is carried out to open the servo loop of the gaze direction beam deflector 130 (e.g. stopping the execution of the servo-loop operation 440). In case the deviation is large enough to be considered a change in the gaze direction and not merely tremor, then operation 432 is carried out to "close" the servo loop of the gaze direction engage execution of the servo-loop operation 440). In this way, agile gaze direction compensation is achieved with a response time in the order of $10^{-3}$ seconds or even in the order of $10^{-4}$ seconds or below, while also compensation over merely tremor motion is avoided.

In some embodiments the readout data/signals RD1 from a light sensor 185 is also passed though secondary velocity and/or acceleration servo loop. The velocity and/or acceleration servo loops may be performed by $1^{st}/2^{nd}$ order differentiation of the signals RD1 to estimate the velocity and/or acceleration properties of the pupil's motion. In these embodiments, the velocity and/or acceleration properties are used to identify/detect saccade motion at early stages by identifying when the velocity and/or acceleration and/or both exceed (rise above) certain respective thresholds. This allows better estimation and early detection of saccade motion.

Turning back to FIG. 3B, in operation 380 of method 300 readout data RD2 is obtained from the second sensor 175. The readout data/signals RD2 is indicative of a projection location PL2 of the returned beam RB on the second sensor 175. In operation 290, the controller 164 and/or a different operator, operates at least the second beam deflector to compensate over variations in a relative position between the eye and the optical system 150 (e.g. compensating/correcting over variations/discrepancies between the lateral position of the propagation axis of the tracking beam TB relative to the line of sight of the eye EYE). For example, the controller 164 may include a processing unit (module/circuit) 170 which according to certain embodiments of the present invention operates at least the second beam deflector in accordance with method 308 illustrated in a flow chart in FIG. 3D.

As shown in FIG. 3C, method 308 includes at least the lateral/pupil position servo-loop operation 450 which adjusts the lateral output position of the tracking light beam TB (or of any other light beam propagating along the optical path OP and exiting the exit pupil EP) to compensate over variations in a gaze direction of the eye. The lateral/pupil position servo-loop operation 450 includes two main sub operations 452 and 454 as follows:

452—the readout data/signals RD2 from the pixels of the second sensor (pupil position direction sensor) 175 are processed to estimate the relative nominal projection location PL2 of the returned light beam RB on the second sensor 175; and 454—the deflection angle/state pupil position beam deflector 140 is adjusted in accordance with the nominal projection location PL1 so as to reduce the lateral deviation between the optical path/axis OP of propagation of the reflected light beam RB reflected from the eye and lateral axis of the line of sight LOS of the eye EYE.

The operations 452 and 454 may be implemented by digital processing unit and/or by a suitable electric processing circuit constituting, or included by, the pupil position controller 170 of the controller 164. Operations 452 and 454 may be carried out in a loop, and may provide quick/agile response to changes in the location of the eye relative to the exit pupil EP with a response time in the order of $10^{-3}$ seconds or even below (e.g. in the order of $10^{-4}$ seconds).

To this end, method 300 provides a technique for tracking and compensating over angular and lateral movements of the eye/pupil relative to the optical path OP of the optical system 150.

In some embodiments of the present invention, the tracking light source 162 is operable to emit the eye tracking light beam TB as a modulated beam having a certain modulation pattern (e.g. an intensity modulation pattern such as sequence of pulses with certain repetition rate). As indicated above the tracking light source 162 may for example include a source of an IR light (e.g. an IR laser/diode) and modulation unit/module adapted for modulating the light TB from the source. The modulation unit/module may include for example a operating control circuitry configured for operating the light source in pulses/modulated-intensity, and/or light modulator located in the optical path of the light beam TB from the light source. FIG. 3E exemplifies in self explanatory manner a flow of a servo loop of the invention which is used for monitoring/tracking the location and/or the line of sight of an eye, in case the eye tracking light beam TB is a modulated beam. Optionally, the eye monitoring module 160 includes a bandpass filter tuned/configured for passing only the specific wavelength/band of the tracking light beam TR so as to filter out noise/clutter being outside this wavelength band. Optionally, the eye monitoring module 160 includes phase locking module(s) 182 and/or 172 associated respectively with the gaze direction controller 180 and/or the pupil position controller 170. The optional phase locking module 182 is configured and operable to obtain modulation data/signals indicative of the modulation pattern of the tracking light beam TB and utilize that modulation data/signals to process/phase-lock the readout information RD1 from the gaze direction sensor 185 with a modulation pattern of the tracking light beam TB and to thereby filter out from the readout information RD1, data/signal associated with noise/background clutter sensed by the gaze direction sensor 180. More specifically the phase locking module 182 filters the readout information RD1 to suppress therefrom data/signals which are not modulated with modulation pattern similar to that of the tracking light beam TB which sources the reflected/returned light beam sensed by the gaze direction sensor 185. In a similar fashion the optional phase locking module 172 is configured and operable to obtain modulation data/signals indicative of the modulation pattern of the tracking light beam TB and utilize that modulation data/signals to process/phase-lock the readout information RD2 from the pupil position sensor 175 with the modulation pattern of the tracking light beam TB. The phase locking module 172 thereby filters the readout information RD2, and suppresses therefrom data/signals associated with noise/background clutter sensed by the pupil position sensor 175. More specifically, the phase locking module 172 filters the readout information RD1 to suppress therefrom data/signals which are not modulated with modulation pattern similar to that of the tracking light beam TB.

This yields a robust configuration which is less sensitive or insensitive to background clutter radiation in the wavelength of the tracking light beam TB.

Thus, the present invention provides an eye projection device 100 capable of directing a light beam, such as an image projection LB, towards the position of at least one eye EYE of a user with proper angular orientation with respect to the eye so that an image can be projected at a desired location on the retina of the eye EYE. In certain embodiments, the eye projection device 100 is configured and operable to monitor changes in the position of the eye EYE, and/or in the orientation of the line of sight LOS of the eye EYE and deflect the light beam (e.g. LB) to track the location and the orientation of the eye EYE so that an image can be projected at fix location on the eye retina even if the user changes his gaze direction or location of the eye projection device is shifted with respect to the eye EYE.

FIG. 4 is a block diagram of an eye projection device 100 including an eye projection systems 101 and 101', for projecting images to both eyes EYE and EYE' of a user. The eye projection systems 101 and 101' may be for example configured similarly to the eye projection system described above with reference to FIG. 3A. Accordingly, the same reference numerals as used in FIG. 3A are also used in the following to refer to similar elements/modules in eye projection system 101 of FIG. 4 and the similar reference numerals with the addition of "'" are used to refer to the elements/modules of eye projection systems 101' of FIG. 4.

The device 100 is furnished on virtual and/or augmented reality glasses GS including the lenses 102 and 102'. The handles and noise bridge of the glasses GS are also shown in the figure for clarity. The eye projection systems 101 and 101' respectively project eye tracking light beams TB and TB' which are directed to respectively reach the user eyes EYE and EYE' via reflection from reflective surfaces on the corresponding lenses 102 and 102'. Returned light beams RB and RB', that are reflected back from the eyes EYE and EYE' are captured by sensors in the eye projection systems 101 and 101' respectively, and are processed to determine positions and the gaze direction of the eyes, and to accordingly adjust the optical propagation paths of the eye projection systems 101 and 101'. The eye projection systems 101 and 101' also respectively project image projection light beams LB and LB' that propagate along the adjusted optical paths of the eye projection systems 101 and 101' which are therefore aimed to project their respective images on fixed locations on the retinas of the eyes EYE and EYE' respectively.

In this example, the common pupil position controller 170 is used for both the eye projection systems 101 and 101'. This common pupil position controller 170 is connectable to the first pupil position sensor 175 of the first eye projection system 101 and also to the second pupil position sensor 175' of the second eye projection system 101'. The pupil position controller 170 is adapted to receive and process the readout data RD2 and RD2' from both pupil position sensors 175 and 175' (e.g. as described above for instance with reference to method 308) and determine the shift in the pupil positions of both eyes EYE and EYE'. Then, the pupil position controller 170 detects "common mode" shifts of the positions of pupils of both of the user eyes thereby enabling to differentiate between shifts that are associated with eye movements and shifts associated with movement of the eye projection device relative to the eyes. This differentiation provides for compensating over shifts of the projection system, for example by rescaling and adjusting the position of the projected image in accordance with the axial and lateral shifts of the projection system respectively.

Figure 5B:
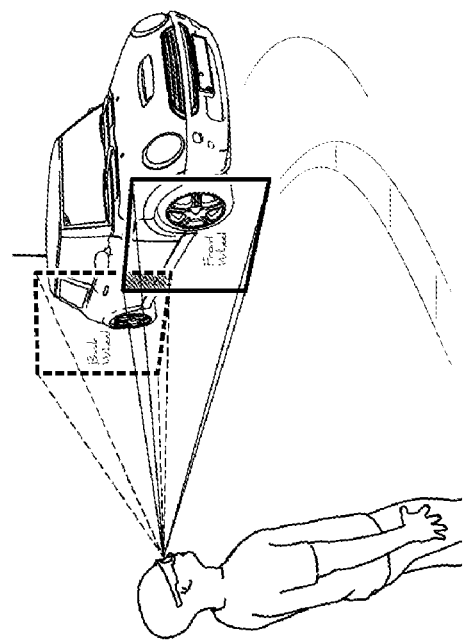
FIGS. 5A and 5B are two illustrative of the use of a head mounted display (HMD) incorporating the system of the invention.
Figure 5A:
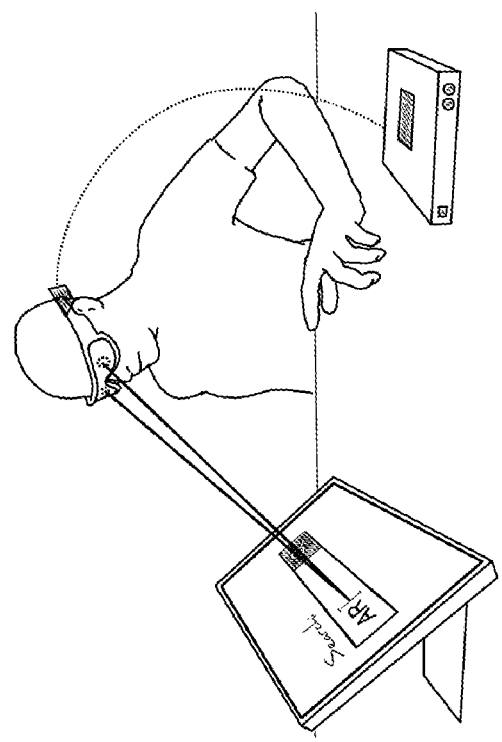

FIGS. 5A and 5B are two illustrative examples, showing in a self-explanatory manner how the technique of the invention can be incorporated in a head mounted display (HMD) suitable for use in variety of applications.

FIG. 5A depicts a user wearing HDM with integrated eye tracker. The entire system includes a wearable optical module and a control unit which can be either part of the head wearable module or be a separate module connected to the optical module. The connection can be either tethered or wireless. The optical module has the eye tracking module which is tracking the position and the angle of each eye separately in respect to the reference points of the device itself. This accurate measurement of the users' eyes is defined as the gaze direction in reference to the optical module, as described above. At least one camera and one inertia measurement unit are used to determine position of the optical module in its environment. This measurement is defined as user head localization and usually performed with an array of cameras and additional sensors such as inertia measurement units, and it is relying on either feature tracking or additional dedicated marker tracking. The connection of device location in the environment (localization) and the users gaze parameters enables accurate eye tracking assessment in respect to the environment. Superimposing information from both eyes provides not only information about in which direction the user is looking but also at what distance. This enables much more accurate demonstration of the overplayed content by the HMD system.

FIG. 5B depicts the user observing an object, in this case a car. The system in use is the same HMD system described above, but also configured to project an image for the user which is superimposed with the actual object. The user is looking sequentially on the front and on the back wheel of the car. The eye tracking system determines the direction and the position of the users' gaze. The system is configured in such a way that the Virtual Field Of View (VFOV) is centered on the gaze direction of the user. Therefore, while the user shifts his gaze the virtual image moves together with it. It is important to note that the visual content which is centered on the users' gaze can either be egocentric— providing virtual overlay with strong connection mainly to the gaze direction, or world anchored—providing virtual layer in respect to the real world environment. This requires not only localization functionality but also world Mapping (SLAM). In the presented image the localization and mapping features are enabled and the virtual overlay information ('front wheel', 'back wheel') is presented to the user with reference to the gaze direction and the object the user is looking as at any specific time.

The invention claimed is:

1. An eye projection device comprising an eye projection system configured for projecting images directly on a retina of an eye, the eye projection system comprises:
    an image projector for encoding an image on at least one light beam;
    an optical assembly comprising an entrance port optically coupled to the image projector for receiving the image encoded light beam from the image projector; an exit port for outputting said image encoded light beam to propagate to the eye along an adjustable propagation path; and a deflector arrangement comprising one or more adjustable optical deflectors configured and operable for adjustment of at least three degrees of freedom of said adjustable propagation path of the light beam between the exit port of the optical assembly and the eye;
    wherein said one or more optical deflectors are configured with at least three adjustable deflection parameters affecting deflection of said propagation path to provide at least three degrees of freedom in adjusting the propagation path of said light beam between said exit port and said eye;
    wherein two of said at least three degrees of freedom are associated with two angular orientations of the propagation path to the eye for compensating over angular changes in a gaze direction of the eye, and at least one of said at least three degrees of freedom are associated with a lateral deflection of the propagation path for compensating over variations in a relative lateral position of said projection device relative to the eye; and wherein said one or more adjustable optical deflectors of the optical assembly are arranged along a general optical path within the optical assembly, in between the entrance and exit ports thereof, and configured and operable for adjustment of said at least three degrees of freedom of said adjustable propagation path of the light beam between the exit port of the optical assembly and the eye, such that said optical assembly need not be moved relative to the eye for carrying out the adjustment of the at least three degrees of freedom.

2. The eye projection device of claim 1, wherein said deflector arrangement comprises at least two of the adjustable deflectors arranged to successively interact with the light beam entering the optical assembly and defining said general optical path.

3. The eye projection device of claim 1, wherein said one or more adjustable optical deflectors have at least one additional deflection parameters, thereby defining at least four deflection parameters to thereby providing at least four degrees of freedom of said propagation path including: said two degrees of freedom provided for compensating over angular changes in the gaze direction of the eye, and two degrees of freedom provided for compensating over variations in a relative lateral position of said projection system relative to the eye with respect to at least two spatial lateral axes.

4. The eye projection system of claim 1, wherein the image projector includes a light source adapted for outputting said light beam to be projected on the retina, and an image light modulator arranged along the general optical path of said light beam and adapted to receive image data indicative of one or more pixels of said image and modulate said light beam to encode said image data on the light beam such said image is formed on the retina.

5. The eye projection device of claim 4, wherein the eye projection device further comprises at least one of the following:
(a) said image light modulator comprises at least one light intensity modulator configured and operable for temporal modulation of the intensity and chromatic composition of the light beam in accordance with the image data and an image scanning deflector configured and operable for performing two dimensional spatial image scan of said light beam and wherein said temporal modulation is performed in synchronization with said two dimensional spatial image scan of said light beam such that said image data is encoded on the light beam for projecting said image;
(b) said image light modulator comprises at least one spatial light modulator configured and operable for spatially modulating an intensity and chromatic composition of said light beam for generating said image that is projected on the retina, and wherein the optical assembly is configured to relay the projected image conjugate plane to the eye retina.

6. The eye projection device of claim 1, wherein at least one adjustable deflector of said deflector arrangement is configured and operable as a pupil position beam deflector for affecting said lateral deflection of the propagation path of said light beam towards the eye.

7. The eye projection device of claim 6, wherein the eye projection device further comprises at least one of the following:
(i) said pupil position beam deflector is configured and operable for affecting said lateral deflection along one lateral axis perpendicular to said propagation path; and
(ii) said pupil position beam deflector is configured and operable for affecting said lateral deflection along two lateral axes perpendicular to said propagation path.

8. The eye projection device of claim 6, wherein said lateral deflection of said propagation path is achieved by changing a deflection angle of said pupil position beam deflector; said optical assembly comprises an optical relay, said pupil position beam deflector being located within said optical relay, such that adjustment of the deflection angle of said pupil position beam deflector affects an orientation of the general optical path within the optical relay and thereby alters the lateral position of the propagation path of the light beam to the eye.

9. The eye projection device of claim 6, wherein said lateral deflection is achieved by translating the position of the pupil position beam deflector along the optical path of the optical assembly thereby changing the intersection location with the light beam, at which the light beam is deflected therefrom, and adjusting the lateral position of the propagation path towards the eye without affecting an angular orientation of the propagation path towards the eye.

10. The eye projection device of claim 9, wherein the eye projection device further comprises at least one of the following:
(i) said optical assembly includes an optical relay, said pupil position beam deflector being located along the optical path of said light beam outside the optical relay;
(ii) said pupil position beam deflector includes two of said adjustable optical deflectors, which are arranged such that:
both of said two adjustable optical deflectors are translatable together along a first lateral axis to affect the relative lateral deflection of the propagation path to the eye with respect to said first lateral axis;
one of said two adjustable optical deflectors is independently translatable along a second lateral axis to affect the relative lateral deflection of the propagation path to the eye with respect to said second lateral axis.

11. The eye projection device of claim 1, wherein at least one adjustable optical deflector of the deflector arrangement is configured and operable as a gaze direction beam deflector for affecting adjustably said angular orientation of the propagation path of said light beam towards the eye.

12. The eye projection device of claim 11 wherein:
said gaze direction beam deflector is also configured and operable as a pupil position beam deflector and is configured for translation along the optical path of the optical assembly such that said translation affects said lateral deflection of the propagation path of said light beam towards the eye; and
deflection of said angular orientation of the propagation path towards the eye is achieved by changing the deflection angle of said gaze direction beam deflector.

13. The eye projection device of claim 1, further comprising an eye tracker configured and operable to measure eye positioning data indicative of a gaze direction and a lateral position of the eye for use in said adjusting of said propagation path towards the eye.

14. The eye projection device of claim 13, wherein said eye tracker comprises:
   a tracking light port configured and operable for providing a tracking light beam directed to propagate along said general optical path of the optical assembly while interacting with said one or more adjustable optical deflectors; whereby incidence of said tracking light beam on said eye giving rise to a reflected light beam associated with a reflection of said tracking light beam from the eye's retina for back propagation through the optical assembly;
   one or more sensors optically coupled to the general optical path at two or more different locations therealong and adapted for receiving said reflected light beam and measuring one or more property of propagation of said reflected light beam at said two or more different locations; and
   an eye tracking controller connectable to said one or more sensors and to one or more adjustable optical deflectors; said controller is adapted to receive from said one or more sensors readout data indicative of said at least one property of propagation of said reflected light beam at said two or more different locations, and process the readout data to determine said eye positioning data.

15. The eye projection device of claim 14 wherein said eye positioning data is indicative of a deviation between said gaze direction of the eye and the orientation of the propagation path of the light beam towards the eye, and a deviation between the lateral position of the pupil of the eye and said propagation path; said one or more adjustable optical deflectors include at least two adjustable optical deflectors arranged successively along said optical path to thereby respectively define two deflection stages of the optical path associated with deflection of the optical path by said two adjustable optical deflectors respectively;
   wherein said two or more different locations at which said one or more sensors are optically coupled to the general optical path are arranged at said two deflection stages respectively; and
   wherein said controller is configured and operable for generating operative instructions for each respective adjustable optical deflector of said two adjustable optical deflectors based on the corresponding property of propagation measured from the respective deflection stage of the optical path associated with said respective adjustable optical deflector.

16. The eye projection device of claim 15, wherein each sensor of said one or more sensor comprises a plurality of light sensitive pixels; and wherein said controller is adapted to process the readout data from said sensor to determine a location of incidence of the reflected light beam on the sensor and determine a deviation between said location of incidence and a predetermined nominal position on the sensor and thereby determining the property of propagation of the reflected light beam associated with a lateral off axis deviation of the propagation of the reflected light beam from a predetermined nominal position.

17. The eye projection device of claim 14, wherein said one or more sensors include a gaze direction sensor comprising a plurality of light detectors; said gaze direction sensor is arranged to collect said reflected light beam from the general optical path at a deflection stage located after the reflected light beam interacts with a gaze direction beam deflector being one of said adjustable optical deflectors associated with adjustment of an angular orientation of the propagation path, such that a readout information from the gaze direction sensor is indicative of angular deviation between a gaze direction of the eye and the propagation path towards the eye; and
   wherein said eye tracking controller includes a gaze direction controller connectable to said gaze direction sensor and to said gaze direction beam deflector; said gaze direction controller is adapted to process said readout information from the gaze direction sensor and operating said gaze direction beam deflector to at least partially compensate for the angular deviation between the gaze direction of the eye and the propagation path of the light beam towards the eye.

18. The eye projection device of claim 17, wherein said gaze direction controller comprises a tremor filter r adapted to process the readout data and filter out angular deviations of the gaze direction, which are associated with tremor movement of the eye.

19. The eye projection device of claim 14, wherein said one or more sensors include a pupil position sensor comprising a plurality of light detectors; said pupil position sensor is arranged to collect said reflected light beam, at a deflection stage located after said reflected light beam interacts with a pupil position beam deflector being one of said adjustable optical deflectors associated with adjustment of a lateral position of the propagation path, such that a readout information from the pupil position sensor is indicative of lateral deviation between a position of the pupil of the eye and the propagation path of the light beam towards the eye; and wherein said eye tracking controller includes a pupil position controller connectable to said pupil position sensor and to said pupil position beam deflector; said pupil position controller is adapted to process said readout information from the pupil position sensor and operating said pupil position beam deflector to at least partially compensate for the lateral deviation between the position of the pupil of the eye and the propagation path.

20. The eye projection device of claim 19, comprising said eye projection system for projecting images to one of a user eyes and a second eye projection system to another one of the user eyes and wherein said pupil position controller is connectable to said pupil position sensor and to a second pupil position sensor of the second eye projection system and is adapted to detect "common mode" shifts of the positions of the pupils of both the user eyes thereby differentiating between shifts associated with eye movements and shifts associated with movement of the eye projection device relative to the eyes.

21. The eye projection device of claim 1, wherein the optical assembly comprises an additional beam deflector being a static beam deflector comprising a reflective or partially-reflective surface arranged along the propagation path of the light beam from said exit port to the eye, such that no moving optical elements are placed in front of the eye.

22. An optical assembly for directing a light beam from an eye projection device to an eye, the optical assembly comprising:
   an entrance port for receiving a light beam encoding an image to be projected to the eye; an exit port for outputting said image encoded light beam to propagate along an adjustable propagation path from said exit port of the optical assembly to the eye; and one or more adjustable optical deflectors located along a general optical path between the entrance port and the exit port and configured to provide adjustment of at least three degrees of freedom of the adjustable propagation path of said light beam from the exit port towards said eye;

wherein two of said degrees of freedom are associated with compensating for angular changes in a gaze direction of the eye, and one or more of said degree of freedom provides for compensating over variations in a relative position of said eye projection device with respect to the eye; and wherein said one or more adjustable optical deflectors of the optical assembly are arranged within the optical assembly, in between the entrance and exit ports thereof, and configured and operable for adjustment of said at least three degrees of freedom of said adjustable propagation path of the light beam between the exit port of the optical assembly and the eye, such that said optical assembly need not be moved relative to the eye for carrying out the adjustment of the at least three degrees of freedom.

23. The optical assembly of claim 22, wherein said one or more adjustable optical deflectors comprise at least two adjustable optical deflectors; and said at least three degrees of freedom are at least four degrees of freedom comprising two degree of freedom for compensating over the variations in a relative position of said eye projection device with respect to the eye.

24. The optical assembly of claim 22, comprises an additional beam deflector being a static beam deflector comprising a reflective or partially-reflective surface arranged along the propagation path of the light beam from said exit port to the eye, such that no moving optical elements are placed in front of the eye.

* * * * *